United States Patent
Skeels et al.

(10) Patent No.: US 9,091,289 B2
(45) Date of Patent: Jul. 28, 2015

(54) ANGULAR NAIL STICK WITH MUCILAGE CONNECTION SYSTEM

(71) Applicant: Stanley Fastening Systems, L.P., North Kingstown, RI (US)

(72) Inventors: Stephen Skeels, Glastonbury, CT (US); Richard Waterman, North Kingstown, RI (US)

(73) Assignee: STANLEY FASTENING SYSTEMS, L.P., North Kingstown, RI (US)

( * ) Notice: Subject to any disclaimer, the term of this patent is extended or adjusted under 35 U.S.C. 154(b) by 134 days.

(21) Appl. No.: 13/667,577

(22) Filed: Nov. 2, 2012

(65) Prior Publication Data

US 2013/0115026 A1    May 9, 2013

Related U.S. Application Data

(60) Provisional application No. 61/557,691, filed on Nov. 9, 2011.

(51) Int. Cl.
F16B 15/02    (2006.01)
F16B 15/08    (2006.01)

(52) U.S. Cl.
CPC ............. *F16B 15/02* (2013.01); *F16B 15/08* (2013.01)

(58) Field of Classification Search
CPC ................................ F16B 15/08; F16B 15/02
USPC .................................................. 411/442–443
See application file for complete search history.

(56) References Cited

U.S. PATENT DOCUMENTS

| | | | | |
|---|---|---|---|---|
| 330,567 | A | * | 11/1885 | Davies ..................... 411/486 |
| 391,773 | A | * | 10/1888 | Bean ....................... 411/489 |
| 660,967 | A | * | 10/1900 | McGaughey .............. 411/439 |
| 1,033,241 | A | * | 7/1912 | Graham ................... 411/473 |
| 1,437,551 | A | * | 12/1922 | Radelet et al. ............. 411/486 |
| 1,761,119 | A | | 6/1930 | Gouldbourn |
| 2,875,664 | A | * | 3/1959 | Crooks .................... 411/439 |
| 3,095,588 | A | * | 7/1963 | Haubold ................... 470/121 |
| 3,481,459 | A | | 12/1969 | Becht |
| 3,758,901 | A | * | 9/1973 | Wainman .................. 470/158 |
| D231,628 | S | | 5/1974 | Bartels |
| 3,861,526 | A | | 1/1975 | Leistner |
| 4,826,381 | A | | 5/1989 | Kiriyama |
| 5,060,797 | A | * | 10/1991 | Sygnator ................... 206/345 |

(Continued)

FOREIGN PATENT DOCUMENTS

| | | |
|---|---|---|
| GB | 1223266 A1 | 2/1971 |
| WO | 8808087 A1 | 10/1988 |

OTHER PUBLICATIONS

Rochus, Johann—European Search Report (EP12191885)—Feb. 18, 2013—Munich.

*Primary Examiner* — Flemming Saether
(74) *Attorney, Agent, or Firm* — Rhonda L. Barton

(57) ABSTRACT

A fastener having a clamp head which has a clamp with a clamp angle in a range of from 75 degrees to greater than 30 degrees. A nail having a clamp head which has a clamp with a clamp angle in a range of from 75 degrees to greater than 25 degrees. A nail stick having a collation angle which has a value greater than 25 degrees. A method of manufacturing a nail stick having a step of punching a collated band of wires to create clamp heads having clamps which respectively have a clamp angles in a range of from 60 degrees to 40 degrees.

14 Claims, 28 Drawing Sheets

(56) References Cited

U.S. PATENT DOCUMENTS

| | | |
|---|---|---|
| 5,865,585 A * | 2/1999 | Sutt, Jr. .......................... 411/442 |
| 6,000,893 A | 12/1999 | Gabriel et al. |
| 6,089,808 A | 7/2000 | Sutt, Jr. |
| 6,581,693 B1 | 6/2003 | Whyde |
| 6,926,485 B1 * | 8/2005 | Wu ................................ 411/433 |
| 7,343,672 B2 | 3/2008 | Caringella et al. |
| 8,047,752 B2 * | 11/2011 | Shida et al. .................... 411/443 |
| 2003/0180120 A1 * | 9/2003 | Wu ................................ 411/443 |

* cited by examiner

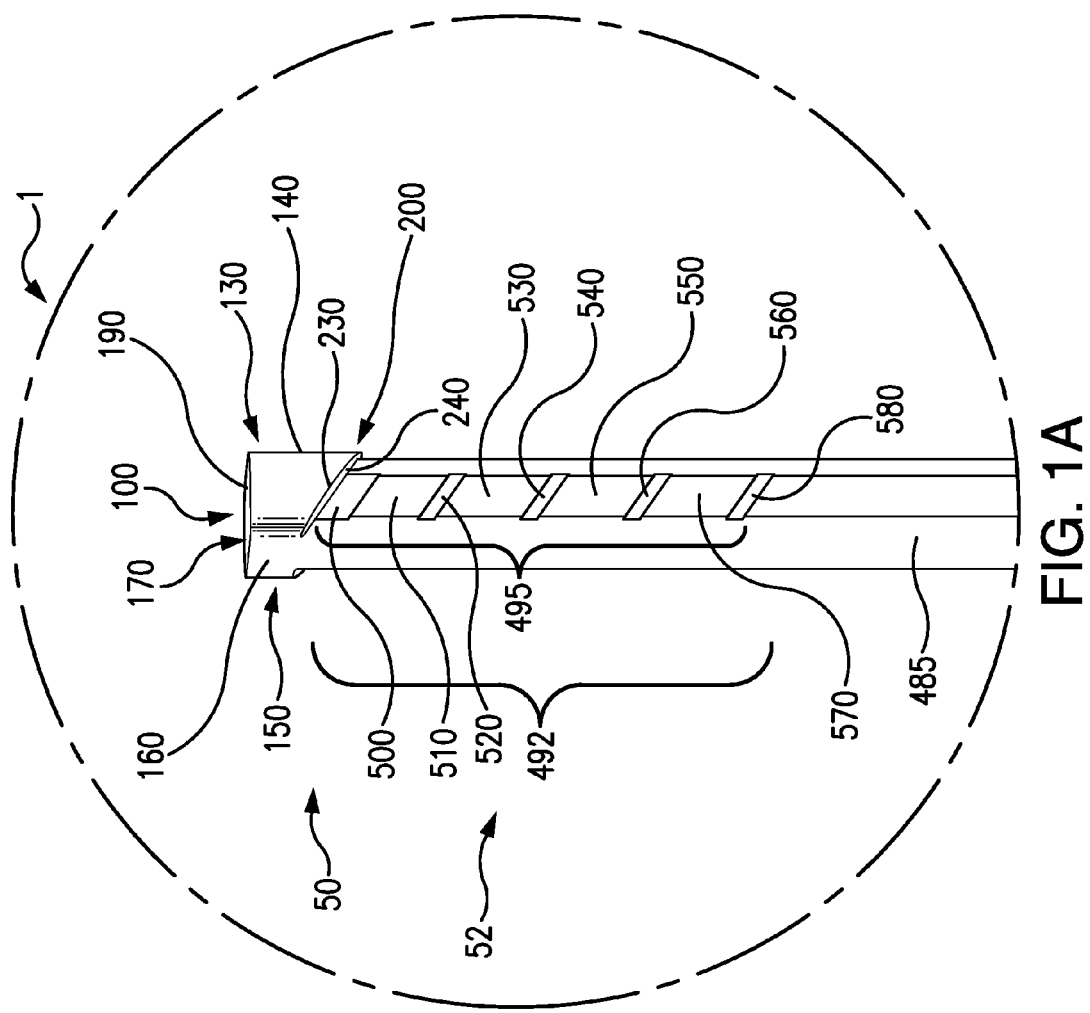

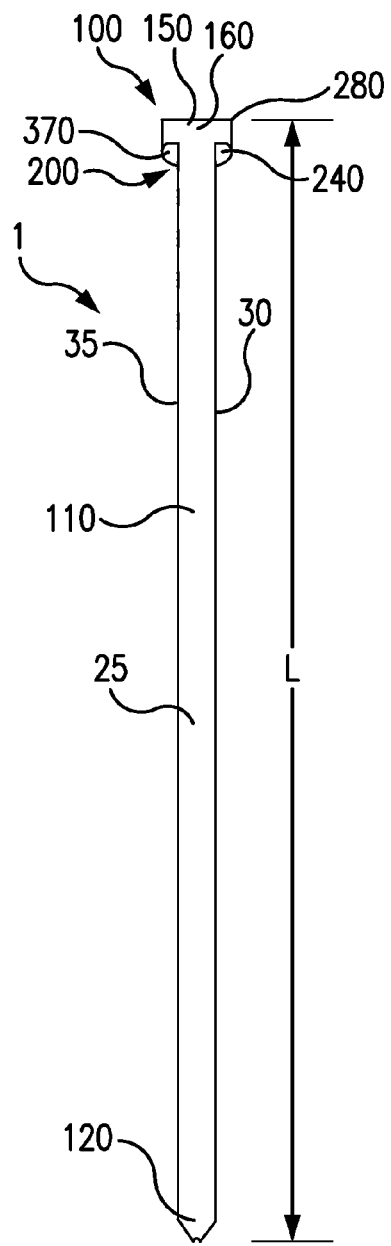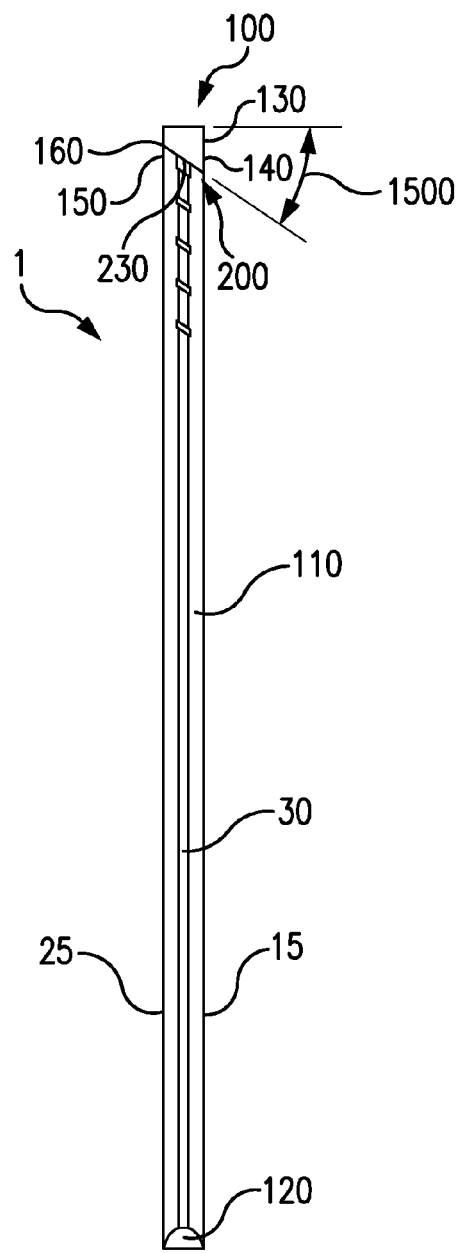
FIG. 4A    FIG. 4B
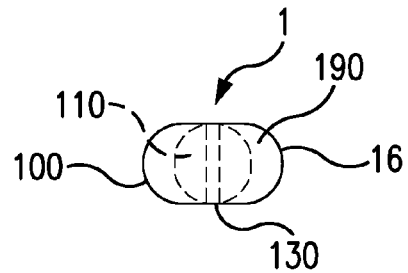
FIG. 4C

| Surface Feature | Min (mm²) | Max (mm²) |
|---|---|---|
| Head Area | 4.728 | 5.666 |
| Clamping Surface** | 2.419 | 3.66 |
| Shank Area | 2.632 | 2.726 |

** Min = Min Head & Max Shank ; Max = Max Head & Min Shank

| Ratio | Min (mm²) | Max (mm²) |
|---|---|---|
| Head to Shank | 1.73 | 2.15 |
| Head to Clamping Surface | 1.29 | 2.34 |
| Clamping Surface to Shank | 0.89 | 1.39 |

FIG. 18

FN Fastener Ratios

| | 18G Min | 18G Max | 16G Min | 16G Max | 15G Min | 15G Max | 14G Min | 14G Max | 12G Min | 12G Max |
|---|---|---|---|---|---|---|---|---|---|---|
| Head to Shank | 1.54 | 3.11 | 1.58 | 3.15 | 1.55 | 2.64 | 1.64 | 2.62 | 1.74 | 2.55 |
| Head to Clamping Surface | 1.00 | 4.21 | 1.04 | 3.85 | 1.21 | 3.77 | 1.23 | 3.38 | 1.30 | 2.98 |
| Clamping Surface to Shank | 0.54 | 2.11 | 0.58 | 2.15 | 0.55 | 1.64 | 0.64 | 1.62 | 0.74 | 1.55 |

FIG. 19

Specifications used in determination of FN Fastener Ratios

| Gage | Wire Dimensions (in) | | | | Head Width (in) | |
| | Min | | Max | | Thickness = Wire Thickness | |
| | Width | Thickness | Width | Thickness | Min | Max |
|---|---|---|---|---|---|---|
| 18G | 0.0345 | 0.0468 | 0.0415 | 0.0532 | 0.07 | 0.09 |
| 16G | 0.05 | 0.06 | 0.0626 | 0.068 | 0.105 | 0.13 |
| 15G | 0.0615 | 0.07 | 0.0731 | 0.076 | 0.115 | 0.14 |
| 14G | 0.0695 | 0.0815 | 0.0775 | 0.0895 | 0.13 | 0.155 |
| 12G | 0.0895 | 0.108 | 0.0975 | 0.116 | 0.175 | 0.205 |

Under head Angle = 34°

FIG. 20

| OAK BOARD INFORMATION | | | | | | | | |
|---|---|---|---|---|---|---|---|---|
| BOARD # | LENGTH | WIDTH | THICKNESS | WEIGHT | VOLUME | DENSITY | Moisture | HARDNESS |
| 5 | 24" | 3.5" | 1/2" | 1.08 lbs | .024 ft$^3$ | 45.0 lb/ft$^3$ | 9.6% | 2499.26 lbf |
| 6 | 24" | 3.51" | 1/2" | 1.07 lbs | .024 ft$^3$ | 44.5 lb/ft$^3$ | 9.35% | 2535.24 lbf |
| 7 | 24" | 3.51" | 1/2" | 1.07 lbs | .024 ft$^3$ | 44.5 lb/ft$^3$ | 8.4% | 2676.81 lbf |

FIG. 23

| SAMPLE GROUP # 1 NAILS | | | | | |
|---|---|---|---|---|---|
| NAIL # | BOARD # | MAX. FORCE (lbf) | NAIL # | BOARD # | MAX. FORCE (lbf) |
| C-1 | 5 | 129.4 | C-16 | 6 | 136.8 |
| C-2 | 5 | 142.7 | C-17 | 6 | 118.3 |
| C-3 | 5 | 150.0 | C-18 | 6 | 115.6 |
| C-4 | 5 | 154.3 | C-19 | 6 | 132.1 |
| C-5 | 5 | 124.5 | C-20 | 6 | 139.1 |
| C-6 | 5 | 133.0 | C-21 | 7 | 146.3 |
| C-7 | 5 | 134.8 | C-22 | 7 | 173.3 |
| C-8 | 5 | 146.2 | C-23 | 7 | 168.0 |
| C-9 | 5 | 143.9 | C-24 | 7 | 150.9 |
| C-10 | 5 | 144.9 | C-25 | 7 | 181.2 |
| C-11 | 6 | 136.7 | C-26 | 7 | 150.6 |
| C-12 | 6 | 143.7 | C-27 | 7 | 141.4 |
| C-13 | 6 | 145.8 | C-28 | 7 | 175.5 |
| C-14 | 6 | 145.8 | C-29 | 7 | 169.0 |
| C-15 | 6 | 119.8 | C-30 | 7 | 142.0 |
| Avg board 5 = 124.9 lbf | | Avg board 6 = 133.3 lbf | | Avg board 7 = 159.8 lbf | |
| | | GROUP AVERAGE = 139.3 lbf | | | |

FIG. 24

| SAMPLE GROUP # 2 NAILS | | | | | |
|---|---|---|---|---|---|
| NAIL # | BOARD # | MAX. FORCE (lbf) | NAIL # | BOARD # | MAX. FORCE (lbf) |
| N-1 | 5 | 181.0 | N-16 | 6 | 186.9 |
| N-2 | 5 | 225.7 | N-17 | 6 | 195.7 |
| N-3 | 5 | 187.6 | N-18 | 6 | 191.2 |
| N-4 | 5 | 234.0 | N-19 | 6 | 183.1 |
| N-5 | 5 | 182.7 | N-20 | 6 | 176.3 |
| N-6 | 5 | 173.1 | N-21 | 7 | 222.8 |
| N-7 | 5 | 180.2 | N-22 | 7 | 175.3 |
| N-8 | 5 | 224.5 | N-23 | 7 | 257.5 |
| N-9 | 5 | 208.7 | N-24 | 7 | 231.5 |
| N-10 | 5 | 200.3 | N-25 | 7 | 250.4 |
| N-11 | 6 | 196.7 | N-26 | 7 | 185.0 |
| N-12 | 6 | 173.8 | N-27 | 7 | 205.1 |
| N-13 | 6 | 191.8 | N-28 | 7 | 220.0 |
| N-14 | 6 | 188.3 | N-29 | 7 | 207.7 |
| N-15 | 6 | 161.8 | N-30 | 7 | 211.0 |
| Avg board 5 = 199.7 lbf | | Avg board 6 = 184.5 lbf | | Avg board 7 = 216.6 lbf | |
| | | GROUP AVERAGE = 200.2 lbf | | | |

FIG. 25

ANGULAR NAIL STICK WITH MUCILAGE CONNECTION SYSTEM

CROSS-REFERENCE TO RELATED APPLICATIONS

This patent application claims benefit under 35 USC §120 of the filing date of copending U.S. provisional patent application No. 61/577,691 entitled "Angular Nail Stick With Mucilage Connection System" filed Nov. 9, 2011, and which is hereby incorporated by reference in its entirety.

FIELD OF THE INVENTION

This invention relates to fasteners and fastener packages thereof, in particular to fasteners which are nails.

BACKGROUND OF THE INVENTION

Collated nails, such as finish nails, typically have been arranged in a nail stick having a collation angle of 25° or less and have nails which are joined to each other by a material such as paper tape. Limitations in manufacturing and insufficient existing nail design have not allowed for effective and cost efficient manufacture of nails collated at an angle greater than 25°. Typical nail designs are insufficient in effectiveness in fastening workpieces together and fail to adequately inhibit nail pull through. There is a strong need for alternative collations of nails which can be efficiently and cost effectively manufactured and which inhibit pull through.

SUMMARY OF THE INVENTION

The invention disclosed herein is a breakthrough in fastener design, nail design and manufacturing. The inventive clamp head nail uses a clamp head which inhibits nail pull through. Additionally, new methods of manufacture are disclosed herein which achieve cost effective and efficient manufacturing of clamp head nails and nail sticks having clamp head nails across a wide range of collation angles greater than 25°.

A clamp head nail can be an embodiment of a T-head nail and a clamp head can be an embodiment of a T-head. A T-head nail, such as the clamp head nail, can be formed in an angulated nail collation assembly having a collation angle of greater than 25° and collated with a mucilage connection system. In an embodiment, a plurality of clamp head nails can be packaged as an angulated nail collation assembly with a mucilage connection system. In an embodiment, the plurality of the clamp head nails can be packaged as an angular nail stick having the collation angle of 34°. Such a nail stick can be used in an angled magazine of a fastener tool.

In an embodiment, a plurality of T-head nails, such as the clamp head nail, can be collated in nail sticks which can be angulated so that the heads can be stepped in a longitudinal direction progressively from one end nail of the array of nails to the other end nail such that the stepped ends and/or the striking surfaces and penetrating edges extend generally along a predetermined angle. In an embodiment, the predetermined angle can be about equal to the angle of a magazine of a fastener driving device, such as a nailer. In an embodiment, nail sticks having T-head nails can use the plurality of clamp head nails.

In an embodiment, the fastening device disclosed herein can be packaged as a nail stick and can have a collation angle and a plurality of clamp head nails configured such that the collation angle has a value greater than 25 degrees. The nail stick can have a collation angle having a value in a range of from 30 degrees to 50 degrees; or 31 degrees to 45 degrees; or about 34 degrees.

The nail stick can have a plurality of nails further comprising a head having a clamp which has a clamp angle having a value in a range of from 75 degrees to greater than 25 degrees; or 60 degrees to 40 degrees; or about 56 degrees. In another embodiment, the fastening device disclosed herein can be a nail having a clamp head having a clamp that has a clamp angle having a value in a range of from 75 degrees to greater than 30 degrees; or 60 degrees to 40 degrees; or about 56 degrees.

In an embodiment, the nail can have a clamp head having a T-head shape. In an aspect, the nail can have a clamp head having a first offset and a second offset. In another aspect, the nail can have a clamp head having a clamping surface with a surface area value in a range of from 2.0 mm^2 to 4 mm^2; or 2.4 mm^2 to 3.7 mm^2.

The nail can have a clamp head having a ratio of head top surface area to clamping surface area in a range of from 1.15 to 2.5; or 1.2 to 2.4; or 1.3 to 2.3.

The nail can have a clamp head having a first offset side which has a first side shank angle having a value in a range of from 115 degrees to 40 degrees and a second offset side having a second side shank angle having a value in a range of from 115 degrees to 40 degrees. The nail can have a clamp head having a first offset side which has a first side shank angle having a value in a range of from 115 degrees to 56 degrees and a second offset side having a second side shank angle having a value in a range of from 115 degrees to 56 degrees.

In another aspect, the inventive fastener can be manufactured by a method of manufacturing of a nail stick having the steps of: providing a collated band having wires; feeding the collated band into press; gripping the band; punching the band and creating one or a plurality of clamp heads on the wires of the collated band such that the plurality of clamp heads have a clamp angle having a value in a range of from 60 degrees to 40 degrees.

In an aspect, the fastener can have a means for fastening, having a nail having a clamping means wherein the clamping means has a clamp which has a clamp angle having a value in a range of from 75 degrees to greater than 30 degrees.

BRIEF DESCRIPTION OF THE DRAWINGS

The present invention in its several aspects and embodiments solves the problems disclosed above and significantly advances the technology of fasteners. The present invention can become more fully understood from the detailed description and the accompanying drawings, wherein:

FIG. 1A is a detailed view of a head end portion of the clamp head nail;

FIG. 4A is a tail side view of the clamp head nail;

FIG. 4B is a first side view of the clamp head nail;

FIG. 4C is a view of a top surface of the clamp head nail;

FIG. 18 is a table of data regarding values and ratios of clamp head geometries;

FIG. 19 is a table of clamp head nail ratios;

FIG. 20 is a table of data associated with FIG. 19;

FIG. 23 is a table of oak board information;

FIG. 24 is a table of data regarding an example non-angular head nail sample group tested in oak;

FIG. 25 is a table of data regarding an example clamp head nail sample group tested in oak;

Herein, like reference numbers in one figure refer to like reference numbers in another figure.

DETAILED DESCRIPTION OF THE INVENTION

The inventive fasteners are a breakthrough in nail design and manufacturing. Additionally, the inventive fasteners inhibit nail pull through. The inventive fasteners, packaging and methods of manufacture disclosed herein can be used under a broad variety of conditions and for numerous applications. The fasteners can be manufactured individually, in a plurality, or as a nail stick. The inventive fasteners can be used individually, or as feed to a variety of nailers and/or other fastening devices. In an embodiment, the inventive fastener can have the clamp head.

The packaging of a plurality of the inventive fasteners can be in the nail stick 10 (e.g. FIG. 2) which can have a collation angle greater than 25° and can be manufactured efficiently and cost effectively. The disclosed method of manufacture and packaging can be used to make available nail sticks across a wide range of collation angles not previously achieved.

Figure 1:
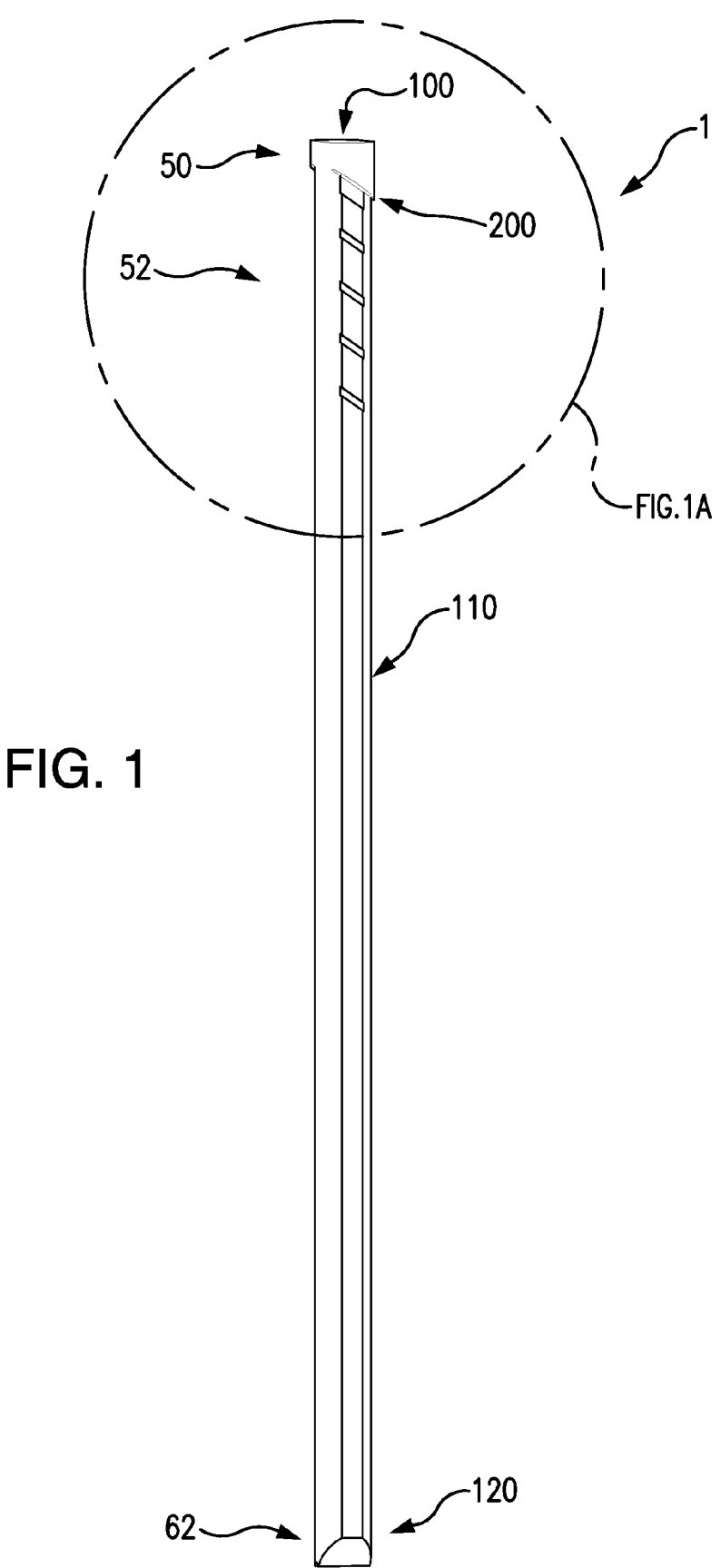
FIG. 1 is a perspective view of a clamp head nail.

FIG. 1 is a perspective view of the clamp head nail 1. In an embodiment, the clamp head nail 1 can have the clamp head 100 which can have a clamp 200. FIG. 1 illustrates the clamp head 100 at a head end 50 of the clamp head nail 1. The clamp head 100 can be located at the head end shank portion 52 of nail shank 110. The clamp head 100 can be integral with a portion of the nail shank 110. FIG. 1 illustrates a nail tip 120 which can be located at a tip end shank portion 62 of the nail shank 110.

FIG. 1A is a detailed view of the head end 50 of the clamp head nail 1. The clamp head 100 of the FIG. 1A embodiment can have a head lead side 130 having a head lead face 140. The clamp head 100 can have a head tail side 150 with a head tail face 160. As illustrated in FIG. 1A the head tail side 150 with the head tail face 160 respectively have at least a portion which is generally flattened and/or flat and/or adapted to conform with adjacent nails in the nail stick 10. The shape of the clamp head 100 achieves the collation of the plurality of clamp head nails 1 in the nail stick 10 array. Optionally, the plurality of clamp head nails 1 forming the nail stick 10 can have nails frangibly connected to one another by cement, mucilage, adhesive, polymer or other material. Such nail sticks can have a collation angle greater than 25°. If manufactured on an individual nail basis, the head tail side 150 and/or head lead side 130 can optionally have a curved surface. In an embodiment, the clamp head 100 can have a head top 170 having a striking surface 190.

FIG. 1A illustrates a first clamp edge 230 of the clamp 200, as well as a first clamping surface 240 of the clamp 200. In an embodiment, the head tail face 160 can be coplanar with a shank tail face 485. In another embodiment, the head tail face 160 and the shank tail face 485 can be aligned on different planes such that there is an edge, back surface, or transition between the head tail face 160 and the shank tail face 485.

Figure 2:
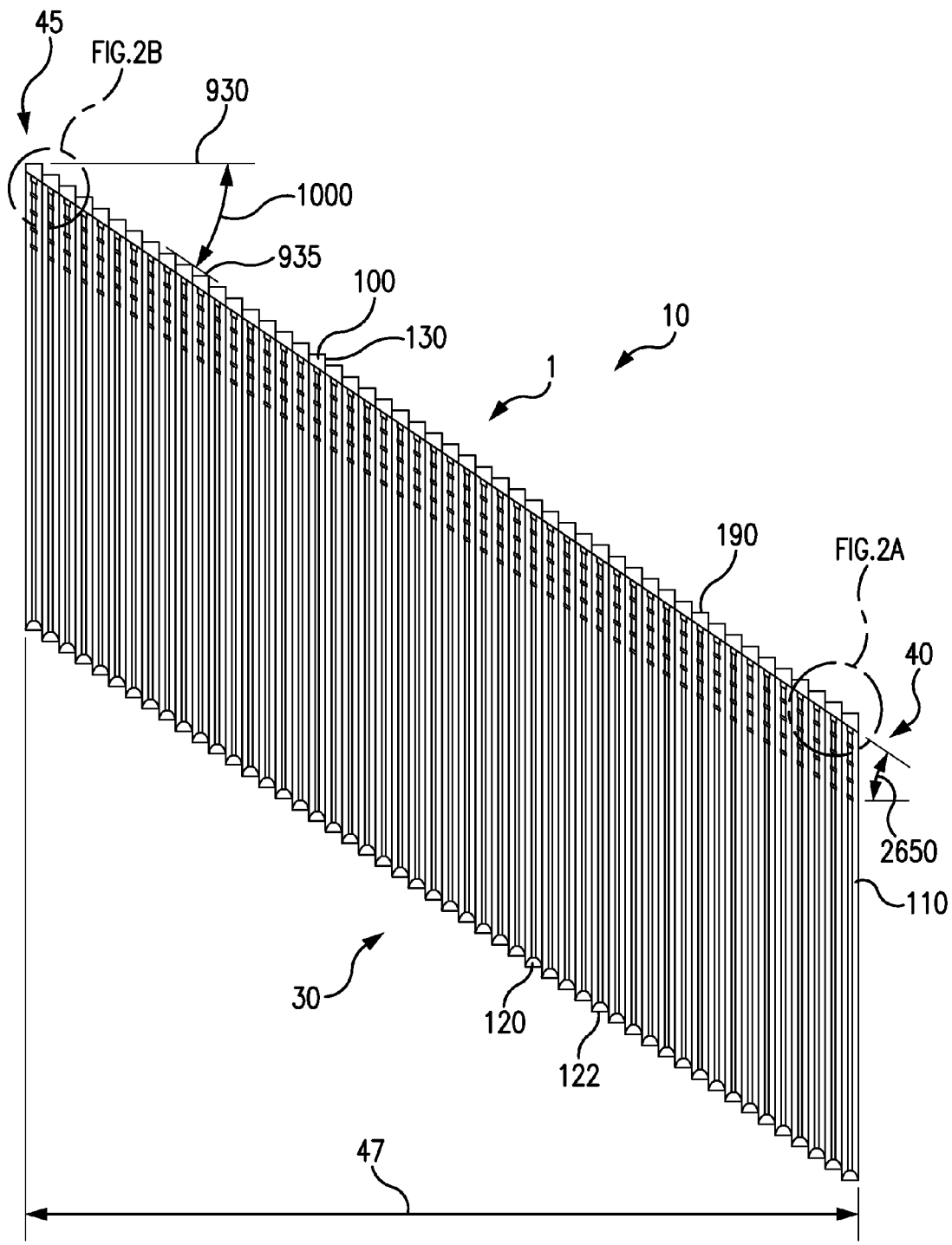
FIG. 2 is a view of a first side of a nail stick having a plurality of clamp head nails.
Figure 5:
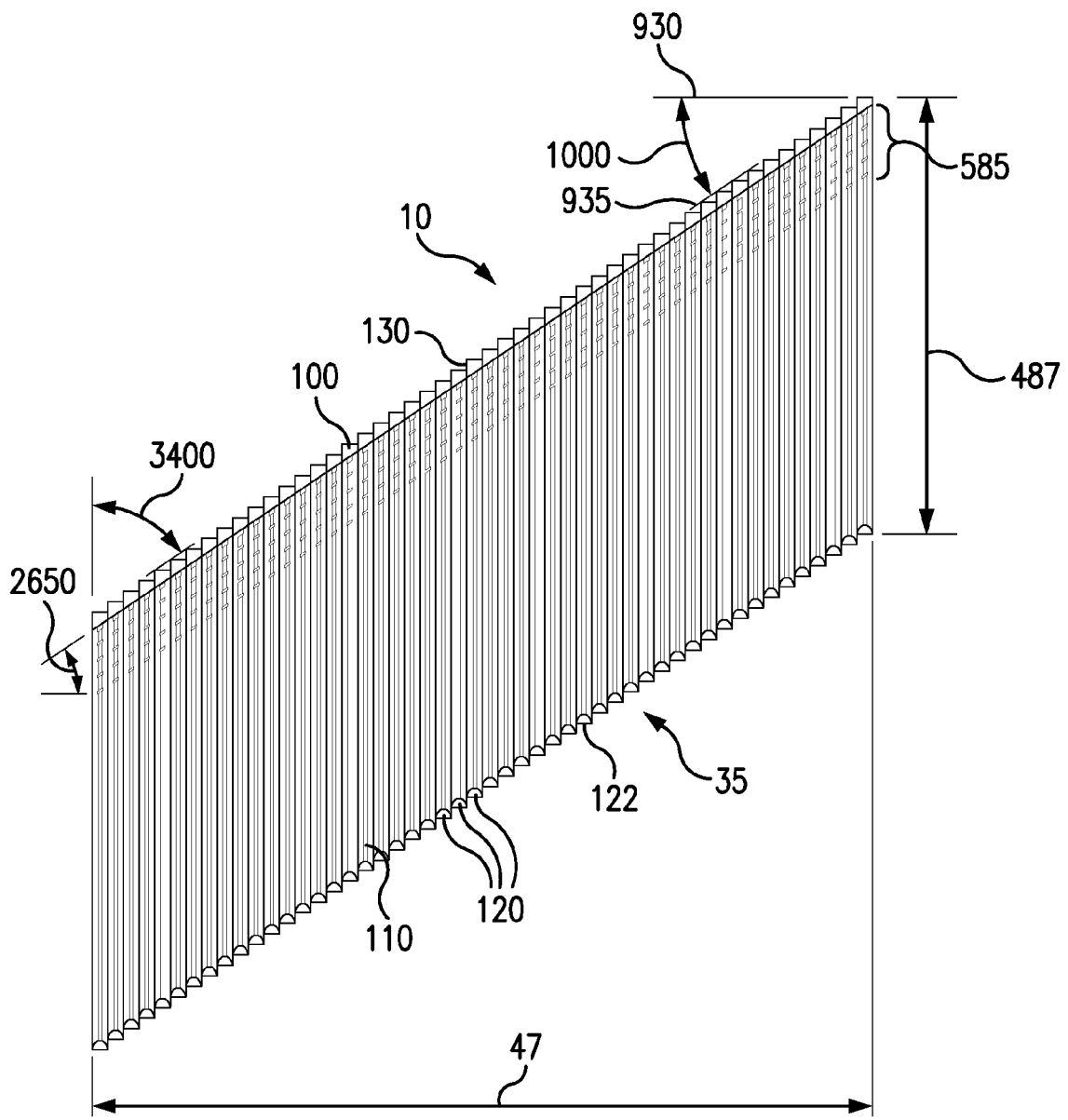
FIG. 5 is a view of a second side of a nail stick having the plurality of clamp head nails.

As shown in FIG. 1A, the clamp head nail 1 and/or a plurality of clamp head nails as shown in FIG. 2 can have a gripper area 492 which can have a first side gripper area 495 and a second side gripper area 585 (FIG. 5).

Figure 17:
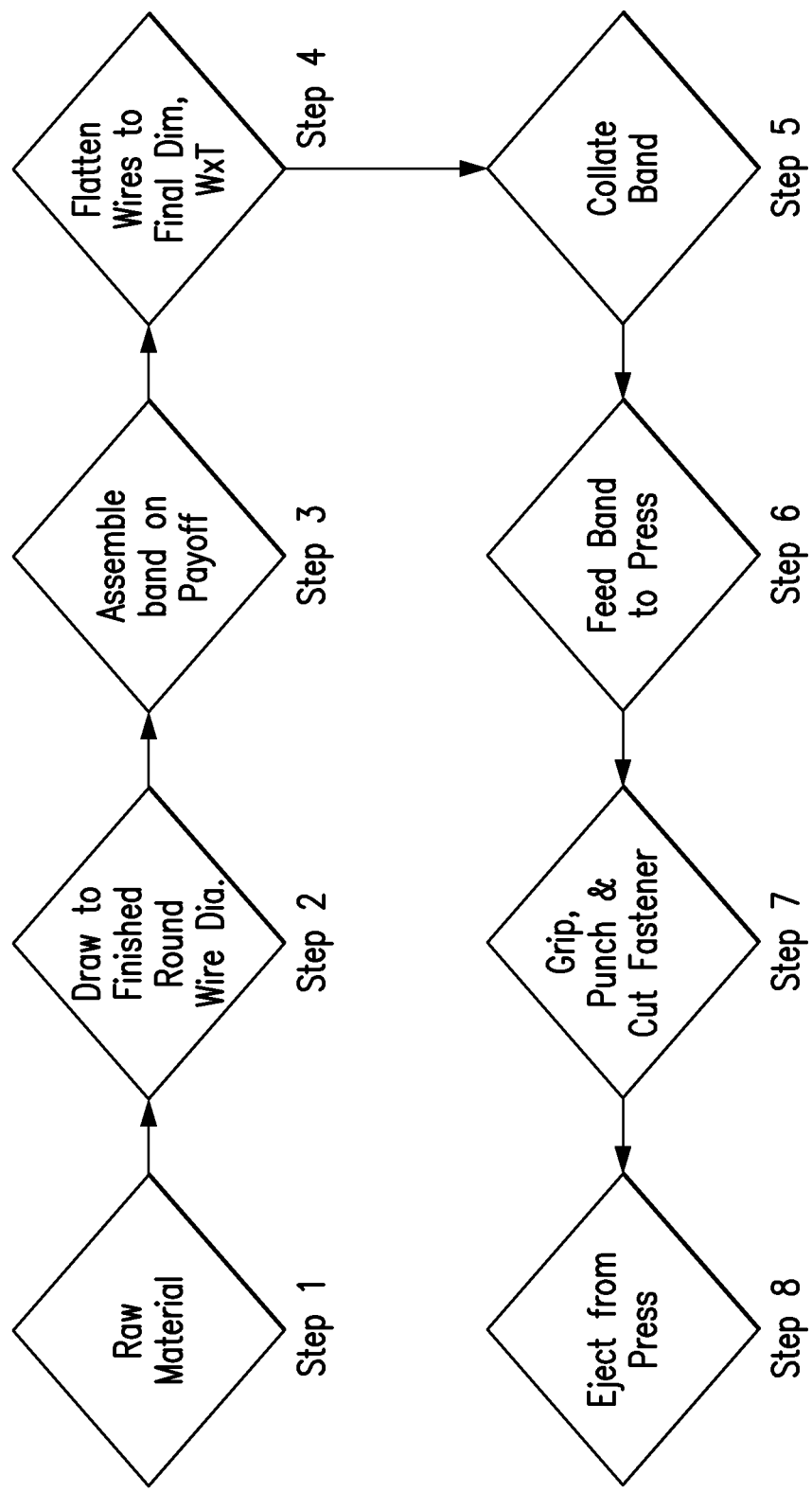
FIG. 17 is a manufacturing flow diagram for the clamp head nail and nail stick.

As disclosed regarding FIG. 17, to manufacture a clamp head nail 1 and/or nail stick 10 having a plurality of clamp head nails, a gripping member or gripping tool can grip a band of wires for heading. In an embodiment, during heading (the step of physically forming a head on a nail) a gripping member or gripping tool can be used as a member against which one or more nail head clamping surfaces can be formed, such as the first clamping surface 240 and a second clamping surface 370 (FIG. 3A).

The gripping by a gripping member or gripping tool can leave gripper marks which can be spaced a variety of ways. In the embodiment shown in FIG. 1 and FIG. 9, a gripping member or gripping tool can leave gripper marks on the first side gripper area 495, such as a first side first gripper mark 500, a first side second gripper mark 520, a first side third gripper mark 540, a first side fourth gripper mark 560, and a first side fifth gripper mark 580. In an embodiment, gripper area surfaces 510, 530, 550 and 570 can be present between adjacent gripper marks on a nail shank 110. This disclosure is not limited in regard to the number of gripper marks or gripper areas which can be used. In an embodiment, a nail can have one or a plurality of gripper marks. Gripper marks numbering from 1 ... n can optionally be used on each of the first side 30 and the second side 35, with n being a large number, such as 100. Optionally, an embodiment of the clamp head nail can have no (zero) gripper marks. Gripper areas numbering from 1 ... n can optionally be used on each of the first side 30 and the second side 35, with n being a large number such as 99. Optionally, an embodiment of the clamp head nail can have no (zero) gripper areas.

FIG. 2 is a view of the first side 30 of the nail stick 10 having the plurality of clamp head nails 1. The plurality of clamp head nails 1 can be collated to achieve the collation angle 1000 of nail stick 10. FIG. 2 illustrates an embodiment of the plurality of clamp head nails 1 which are collated and present in the nail stick 10. The number of clamp head nails of the plurality of clamp head nails 1 can range from 1 ... n, where n is a large number such as 1000; or the nails can be fed in a continuous band having a very large number of nails.

In an embodiment, the collation angle 1000 can be measured as shown in FIG. 2 from a top surface plane 930 (also for example FIG. 7) to a head collation plane 935.

Numeric values and ranges herein, unless otherwise stated, also are intended to have associated with them a tolerance and to account for variances of design and manufacturing, and/or operational and performance fluctuations. Thus, a number disclosed herein is intended to disclose values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance, as well as operational or performance fluctuations, are an expected aspect of mechanical design and the numbers disclosed herein are intended to be construed to allow for such factors (in non-limiting for example ±10 percent of a given value). This disclosure is to be broadly construed. Likewise, the claims are to be broadly construed in their recitations of numbers and ranges.

The collation angle 1000 can have a value in a wide range of from greater than 25° to 75°. In an embodiment, the collation angle 1000 can have a value in a range of from 26° to 66°; or 27° to 56°; 30° to 50°; or 31° to 45°; or 40° to 45°; or 32° to 42° ; or 32° to 36°; or 33° to 41°; or 34° to 40°; or 34° to 39°; or 34° to 38°; or 34° to 37°; or 34° to 36°; or 34° to 35°. In an example, the embodiment of FIG. 2 can have the collation angle 1000 of 34°, or about 34°.

FIG. 2 illustrates features of the plurality of clamp head nails 1 and of the nail stick 10, such as the clamp head 100. The clamp head 100 can have the head lead side 130. Optionally, in an embodiment, the clamp head 100 can have the striking surface 190 which is flat or generally flat. In an embodiment, gripper area surfaces can have one or more of a clamping surface, such as the first clamping surface 240 and a second clamping surface 370 (such as a first flat surface, a second flat surface ... an $n^{th}$ flat surface). In an embodiment, a plurality of the clamping surfaces can be coplanar, and can be located at a position on the shank proximate to the clamp head 100, or other position along the nail shank 110. FIG. 2 illustrates a lead end 40 of the nail stick 10 and a tail end 45, as well as a nail stick length 47. The nail stick length 47 can have a value in a wide range, such as 1 inch, or less, through 24 inches, or greater.

Respectively, the clamp head nail 1 of the plurality of clamp head nails 1 can have a nail shank 110. In an embodiment, the nail shank 110 can be elongated. Optionally, the plurality of clamp head nails 1 can be in the nail stick 10 in which the nail shank 110 of the clamp head nail 1 can abut the nail shank 110 of another clamp head nail 1. In an embodiment, the plurality of clamp head nails 1 can have a plurality of the nail shanks 110 which are abutting.

FIG. 2 also illustrates the plurality of clamp head nails 1 as respectively having a nail tip edge 122, which can optionally be a chiseled edge, a flat chisel edge, penetrating edge, another type if edge, or a point. FIG. 2 illustrates the plurality of clamp head nails 1 as respectively having the nail tip 120 with the nail tip edge 122.

In an embodiment, the plurality of clamp head nails 1 can be collated at the collation angle 1000 and can form an angulated nail stick and each nail can be an angulated nail, such as the clamp head nail 1, having an angled design and clamp head 100.

FIG. 2 is a first side 30 view of a T-head nail stick generally indicated as the nail stick 10. In an example, a plurality of T-head nails having the clamp head 100 can form the T-head nail stick. The nail stick 10 can comprise a plurality of individual T-head nails which can be of similar construction and configuration frangibly secured together in a side-by-side angularly extending array. In an embodiment, one or more nails in the nail stick 10 can be of different construction.

As shown, each T-head nail includes the nail shank 110 formed of metal wire having one end thereof configured to facilitate penetration of the nail into a workpiece. As shown, the penetrating end of each nail shank 110 is formed with the nail tip edge 122 which can have a chisel edge which extends in a direction perpendicular to the axis of the shank and intersects the same at the midpoint thereof. In the example of FIG. 2, a plurality of the nail tip edge 122 can be V-shaped in cross-sectional configuration. The opposite end of the nail shank 110 having the head 100 can be formed, as by forging or swaging or the like, to have a T-head.

Figure 7:
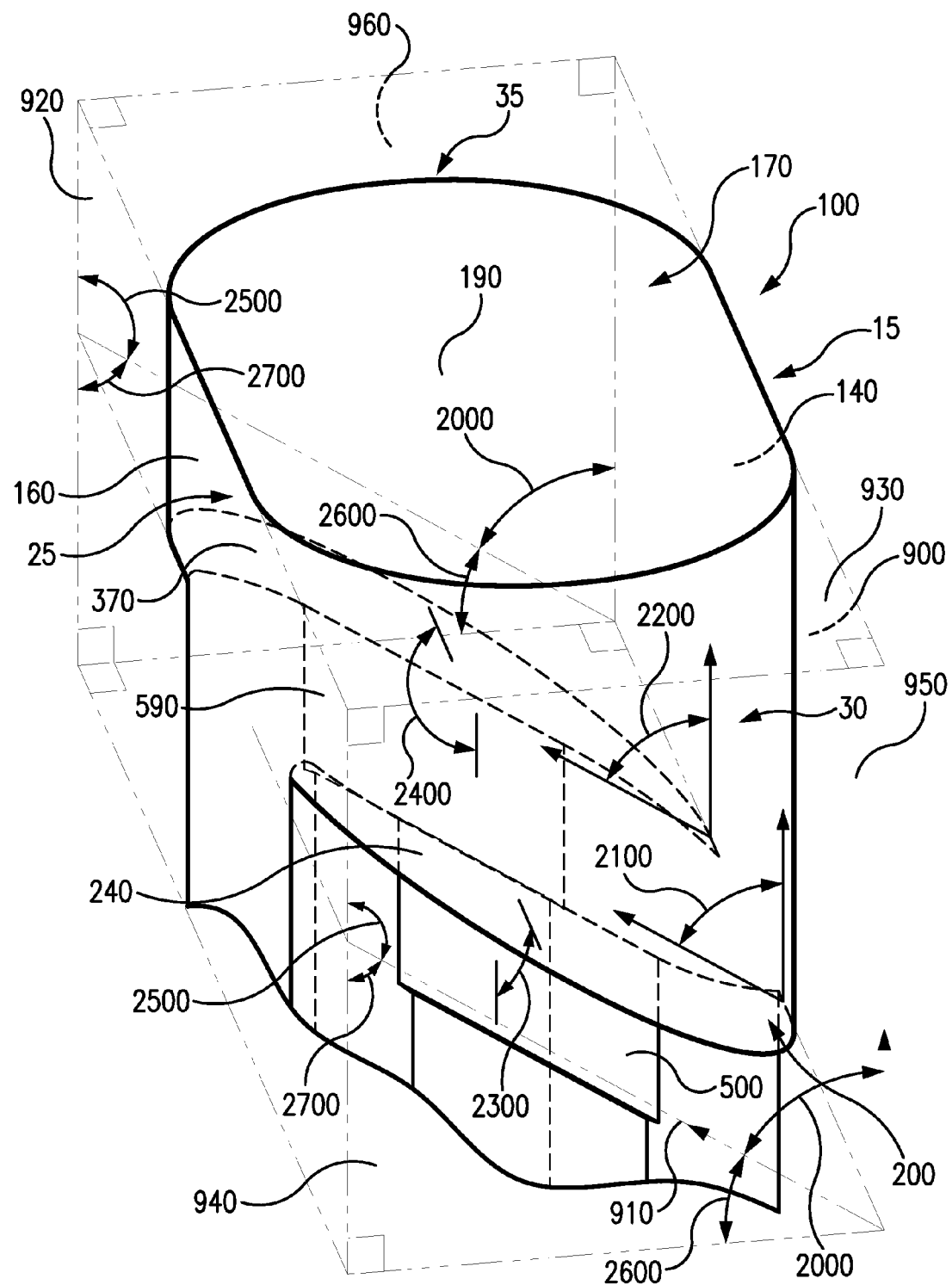
FIG. 7 illustrates the geometry and angles of the clamp head.
Figure 8:
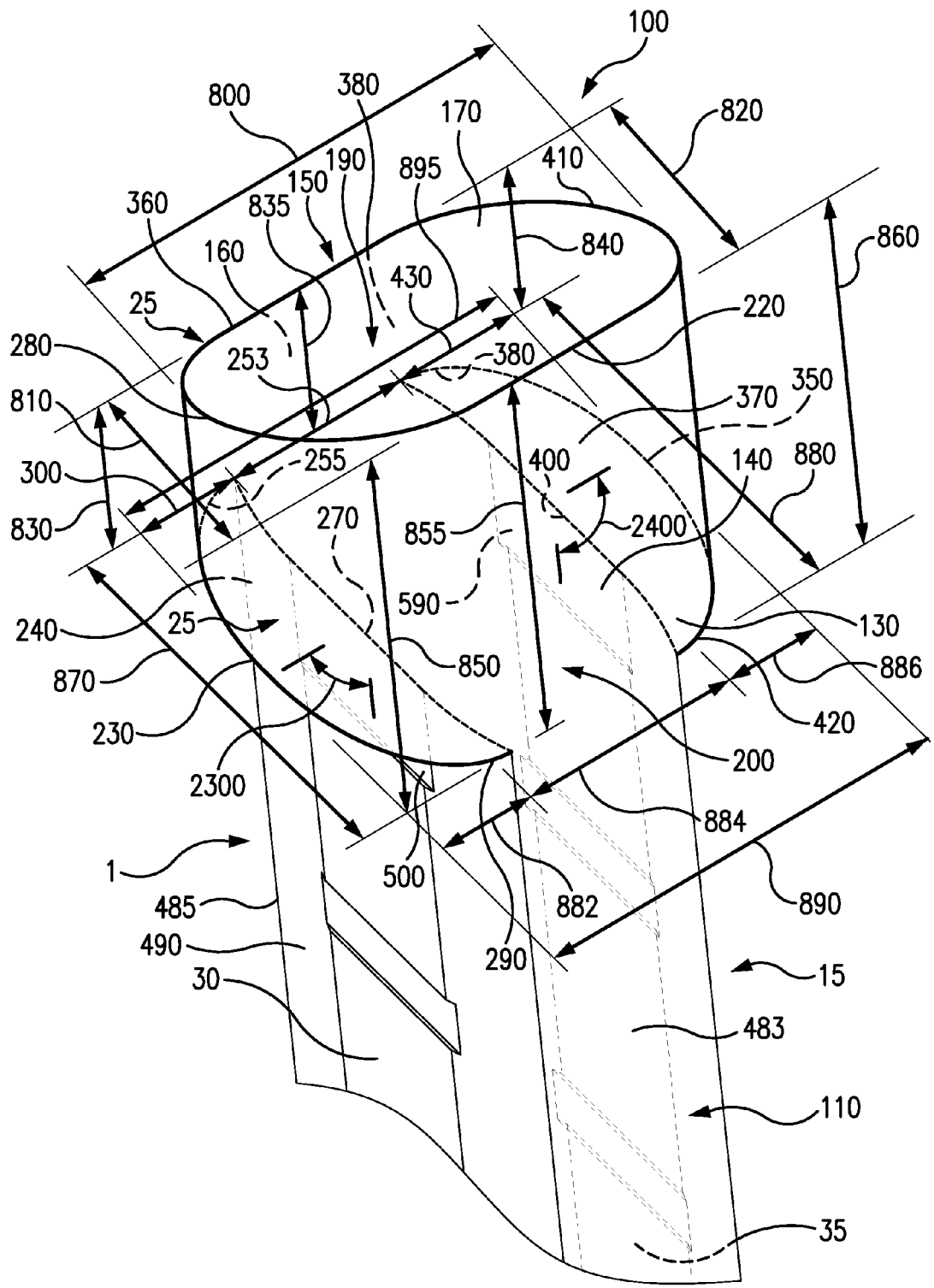
FIG. 8 is a detailed perspective view of the clamp head illustrating clamp head dimensions.
Figure 16:
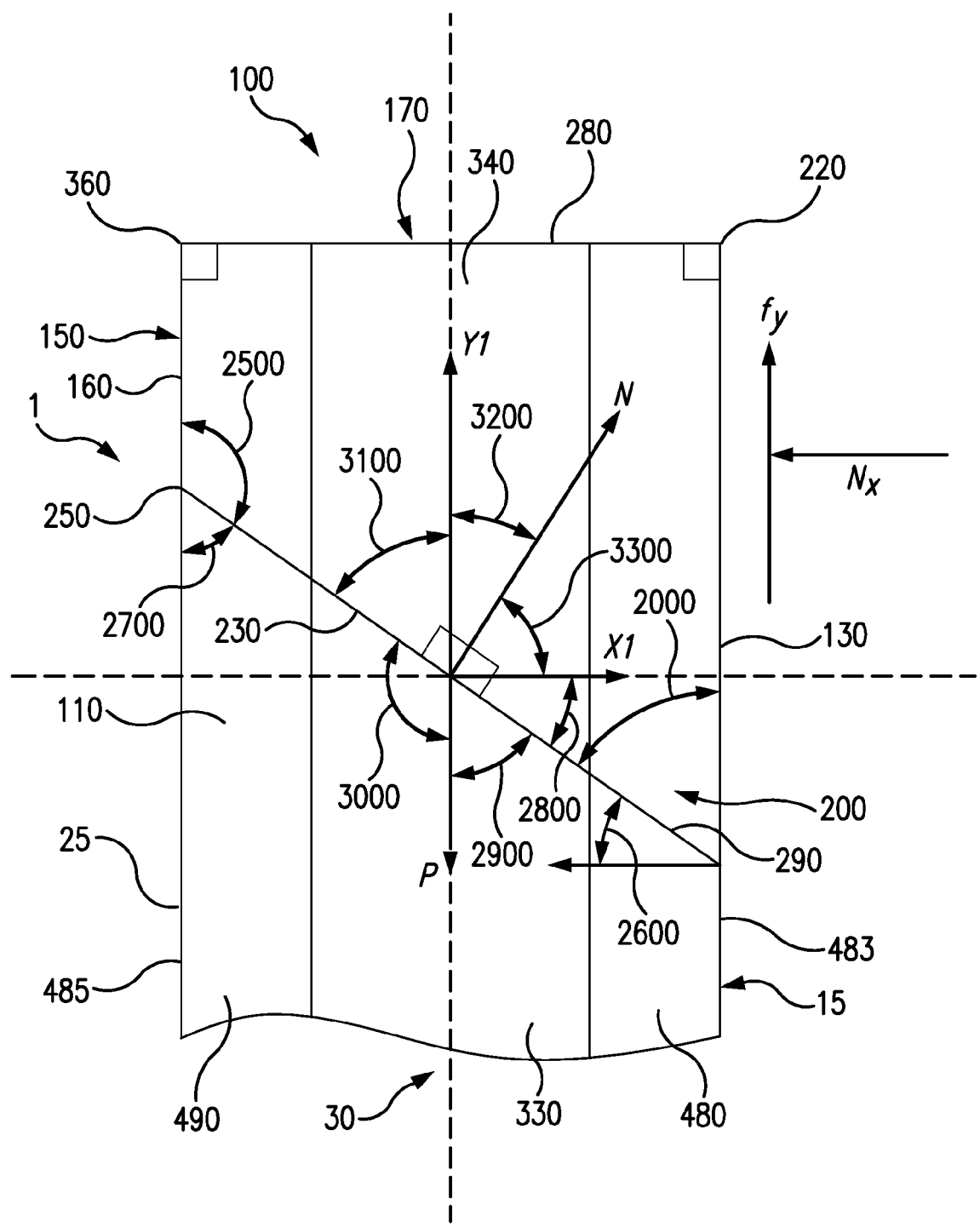
FIG. 16 is a first side view detailed view of the clamp head illustrating clamp head angles.

The nails in the stick formation array can be oriented generally such that the plurality of the nail shanks 110 of the nails are in abutting relation in the direction of extent of the stick formation array and the head offset portions 16 (FIG. 3) can extend in opposite directions at right angles to the direction of extent of the stick formation array and likewise are in abutting relation. The individual nails of the array however can be longitudinally offset in the stick formation optionally in equal amounts so that the plurality of nail tip edges 122 can be in a step formation and the upwardly facing plurality of striking surfaces 190 likewise can also be in a step formation. In an embodiment, the clamping surfaces on each side of the array can be disposed in a common plane and, preferably, the clamping surfaces on both sides are likewise disposed in the same common plane. The clamping surfaces can also be disposed on different planes. In an embodiment, the clamping surfaces, such as the first clamping surface 240 and second clamping surface 370 (FIG. 4A), can be angled 32°-36° from the striking surface 190 of the nails. As illustrated in FIG. 2, the clamping surfaces, such as the first clamping surface 240 and second clamping surface 370, can be angled 34° from the striking surface 190 (FIG. 8). FIG. 2 also illustrates nail stick guide angle 2650 which can have a value the same as the guide angle 2600 (FIGS. 7 and 16). The nail stick guide angle 2650 can orient the clamping surfaces of the clamp head nail such that their surfaces can be on a plane parallel to the collation angle. Optionally, the nail stick guide angle 2650 and a nail guide angle can be used to guide the collated nails, or a nail, feed through a nailer magazine. In an embodiment, a nailer magazine can be adapted to feed the nail stick 10 having a collation 1000 angle of greater than 25°, such as 34°.

Figure 2A:
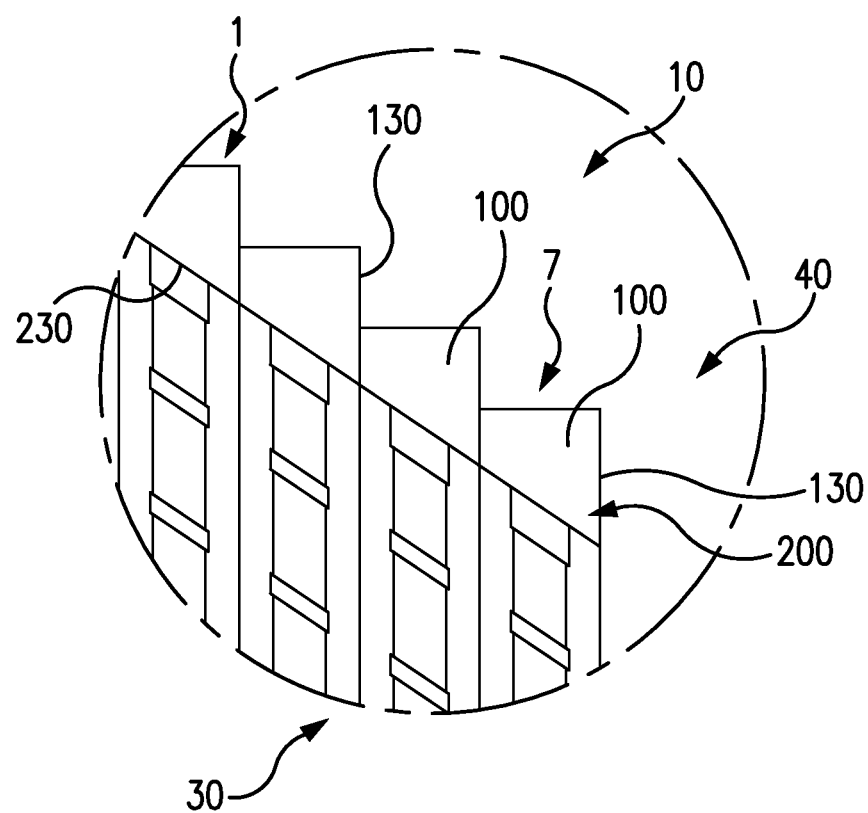
FIG. 2A is a first side detailed view of the plurality of clamp head nails proximate to a lead end of the nail stick.

FIG. 2A is a first side 30 detailed view of a plurality of clamp head nails 1 proximate to the lead end 40 of the nail stick 10 having a first nail 7.

Figure 2B:
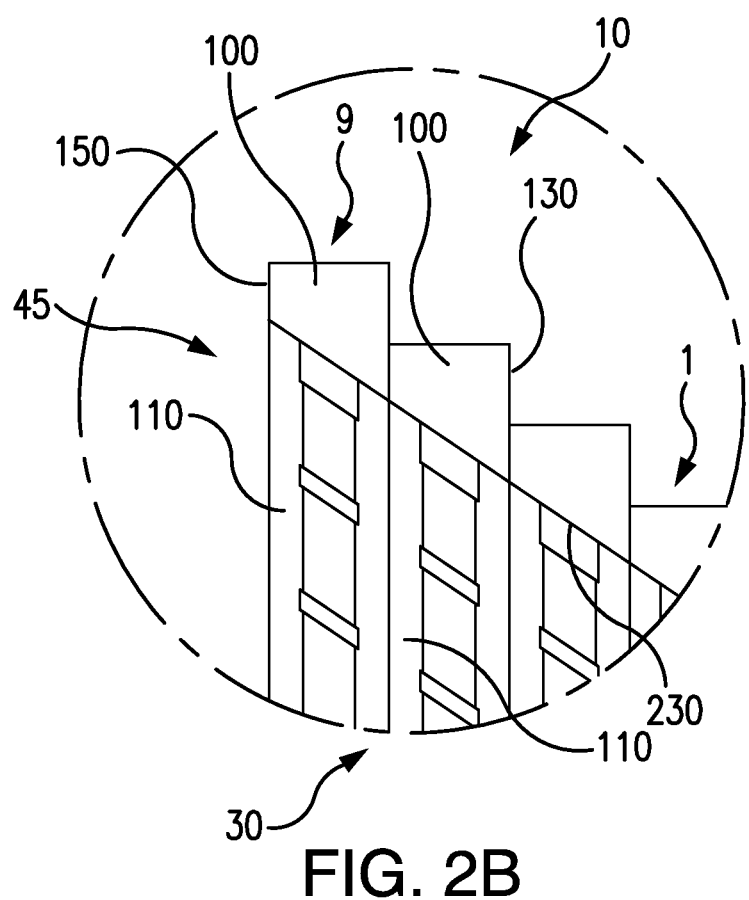
FIG. 2B is a first side detailed view of the plurality of clamp head nails proximate to a tail end of the nail stick.

FIG. 2B is a first side 30 detailed view of the plurality of clamp head nails 1 proximate to the tail end 45 of the nail stick having a last nail 9.

Figure 3:
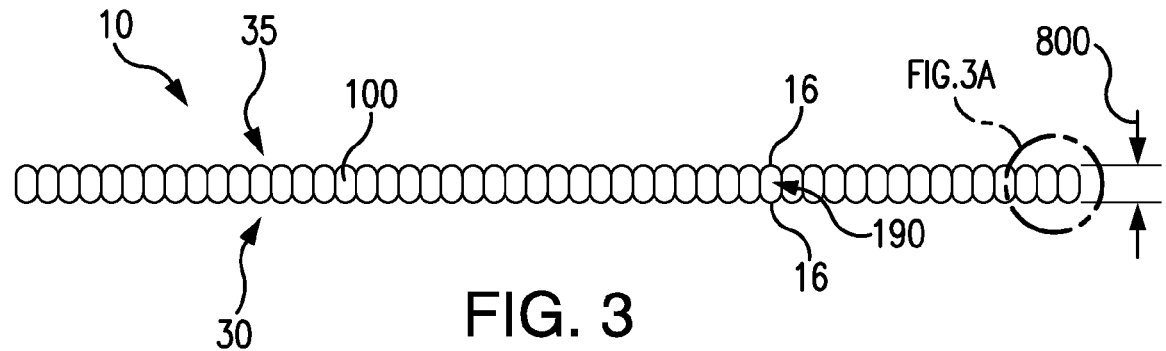
FIG. 3 is a top view of a nail stick having the plurality of clamp head nails.
Figure 3A:
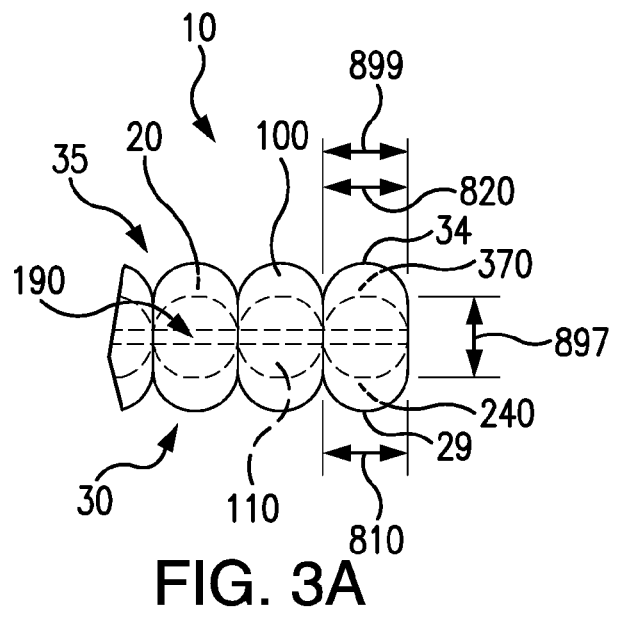
FIG. 3A is a detailed view of the top surface of the plurality of clamp head nails.

FIG. 3 is a top view of the nail stick 10 having the plurality of clamp head nails 1. In an embodiment, a T-head of a nail can have head offset portions 16 extending outwardly from the shank in opposite directions perpendicular to the longitudinal extent of the shank. In FIG. 3 the first side 30 and the second side 35 head offset portions 16 are shown to extend opposite of each other both in the individual clamp head nail 1 and the nail stick 10. A view of first side 30 can be viewed in FIG. 2 and a view of second side 35 can be viewed in FIG. 5. FIG. 8 illustrates a clamp head width 800.

The head offset portions 16 form an adjacent portion of the nail shank 110 and can comprise at least a striking surface 190, which can optionally have at least a portion which is flattened for striking and faces in a direction away from the nail tip edge 122. The head offset portions 16 can also have one or more clamping surfaces which can respectively face in a direction generally opposed to the direction in which the striking surface 190 faces.

The first clamping surface 240 and the second clamping surface 370 of the head offset portions 16 of the clamp head nail 1 can be disposed in the same flat plane (FIG. 7). Preferably, this flat plane can extend at an angle with respect to a plane passing through the striking surface. The angle of the plane can be greater than 25°. The angular relationship between the clamping surfaces which can optionally be coplanar beneath the head offset portions 16 with respect to the striking surface 190 on the top of the nail can be related to the manner in which the series of nails can be assembled in the array forming the stick 10. FIG. 3 illustrates the head offset portions 16 which in an embodiment can consist of an offset of material to the first side 30 which forms at least the portion of the head having the first clamping surface 240 of clamp 200, as well as an offset of material to the second side 35 which forms at least the portion of the head having the second clamping surface 370 of clamp 200.

FIG. 3A is a detailed view of the striking surface 190 of the plurality of clamp head nails 1 having first side top length 810, a shank length 899 and a nail shank width 897. In an embodiment, a first side top length 810 and the shank length 899 can have the same length. In an embodiment, the head offset portions 16 can have a first offset 29 on the first side 30 having a first clamping surface 240 and a second offset 34 on the second side 35 having a second clamping surface 370.

FIG. 4A is a nail tail side 25 view of the clamp head nail 1. The nail tail side 25 is adapted to abut the nail lead side 15 of an adjacent nail. The head tail face 160 of the head tail side 150 can be shaped to conform to the head lead face 140 of a head lead side 130 of an adjacent clamp head nail 1. Such a configuration allows the plurality of clamp head nails 1 to be collated in a nail stick 10 at the collation angle 1000 (FIG. 2) of greater than 25°. In an embodiment the head tail face 160 and the head lead face 140 can respectively have at least a relatively flat portion, or a generally flattened or flat surface to achieve collation and frangible attachment of the plurality of clamp head nails 1. FIG. 4A also shows the first clamping surface 240 and the second clamping surface 370.

FIG. 4B is a first side 30 view of the clamp head nail 1 illustrating and embodiment of the shape of the nail tail side 25 and the nail lead side 15 such that the plurality of clamp head nails 1 can be collated in a nail stick 10 at the collation angle 1000 (FIG. 2) of greater than 25°. In this embodiment the respective sides have at least a portion which is generally straight and/or flattened to abut adjacent to a lead or tail side of an adjacent clamp head nail 1. FIG. 4B illustrates an embodiment in which a head angle 1500 is 34°, or about 34°. The head angle 1500 can have value in a wide range from greater than 25° to 75°.

FIG. 4C is a view of the striking surface 190 the clamp head nail 1 illustrating and embodiment of having a shape configure to allows the plurality of clamp head nails 1 to be collated in a nail stick 10 at the collation angle 1000.

FIG. 5 is a view of the second side 35 of the nail stick 10 having a plurality of clamp head nails 1. FIG. 5 further illustrates the collation angle 1000, as well as a complementary nail shank angle 3400, and a nail length 487.

Figure 6:
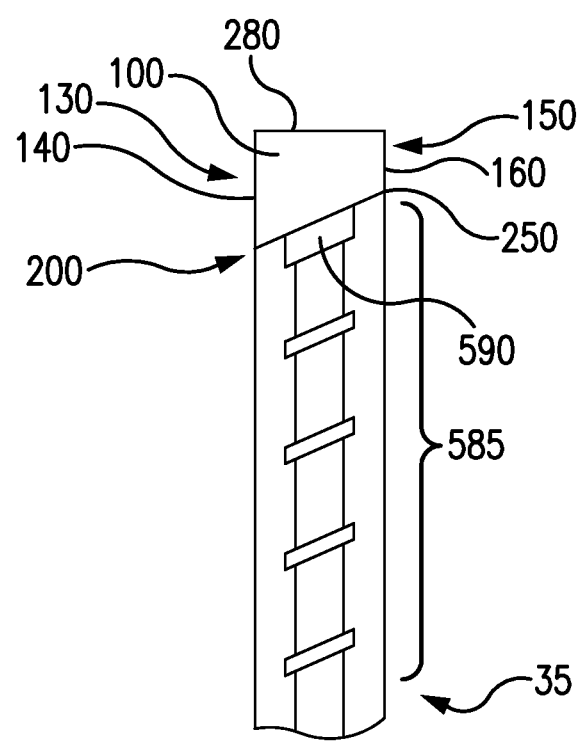
FIG. 6 is a detailed view of a second side of the clamp head nail.

FIG. 6 is a detailed view of the second side 35 of the clamp head nail 1.

FIG. 7 illustrates the geometry and angles of the clamp head 100 having a clamp 200. The clamp 200 has the head lead face 140 that is on the nail lead side 15. The clamp head 100 has the head tail face 160 on the nail tail side 25, as well as the head top 170 having the striking surface 190.

In addition to the first clamping surface 240, the clamp head 100 can also have the second clamping surface 370. The first clamping surface 240 and the second clamping surface 370 can be added together to be the clamping surface. The surface area of the first clamping surface 240 and the surface area of the second clamping surface 370 can be added together to be the surface area of the clamping surface. FIGS. 23-25 provide example data and ratios regarding head geometry.

FIG. 7 illustrates a number of planes associated with the geometry of the clamp head 100. The first clamping surface 240 and the second clamping surface 370, because of their respective angles, can be the same or different and contribute to inhibiting pull through of the clamp head nail 1 through a workpiece. As disclosed in the Example and in conjunction with FIGS. 28 and 29, this breakthrough in inhibiting pull through of clamp head nails can be at least, in part, attributed to clamp angle 2000, the clamping surfaces 240 and 370 and the geometry and shape of the clamp head 100.

Figure 28:
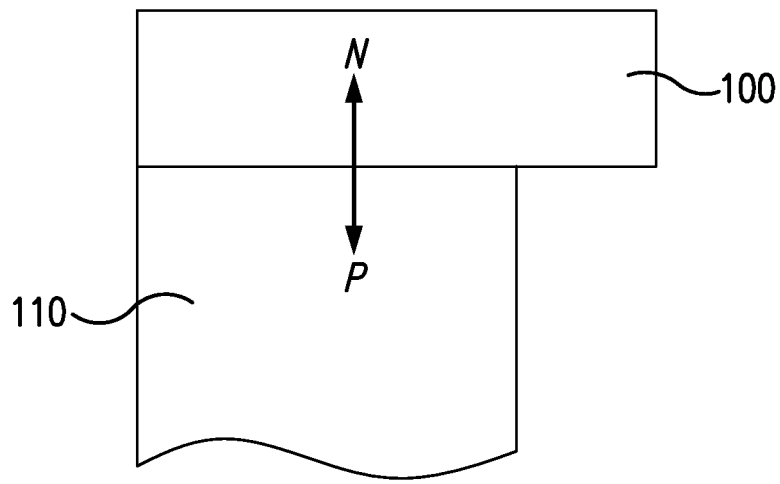
FIG. 28 is a non-angular head profile.
Figure 29:
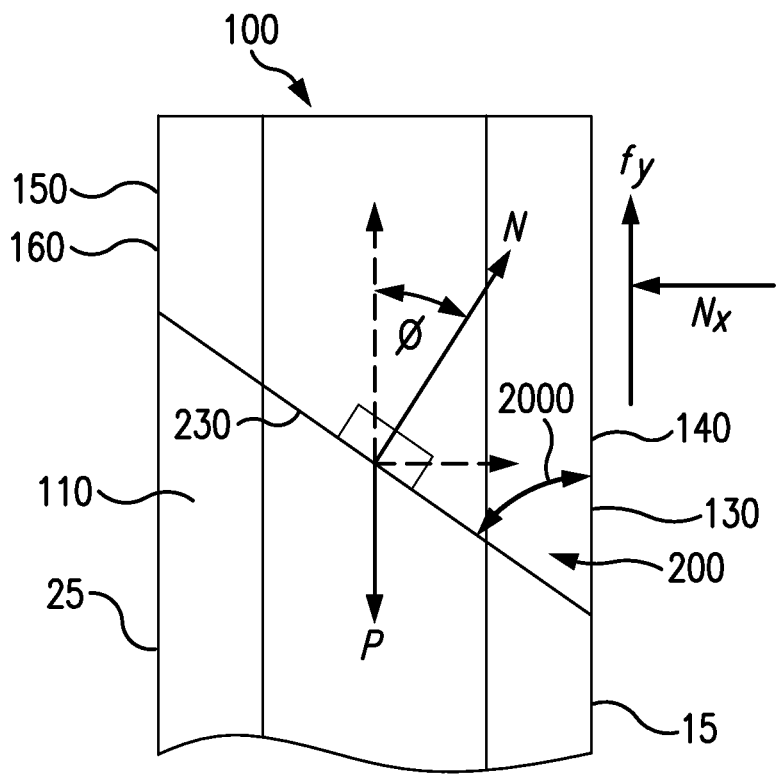
FIG. 29 is the clamp head profile.

In the embodiment of FIG. 7, a lead plane 900 can be perpendicular to the top surface plane 930. A clamping surface plane 910 can intersect the lead plane 900 at a clamp angle 2000. Clamp angle 2000 can impact the direction of normal force from the clamping surfaces when a force is applied (FIGS. 28 and 29). The clamping surface plane 910 can be coplanar with the first clamping surface 240 and the second clamping surface 370. The first clamping surface 240 intersects the lead plane 900 and forms a first clamp angle 2100; and the second clamping surface 370 intersects the lead plane 900 and forms a second clamp angle 2200. In an embodiment, the first clamping surface 240 and the second clamping surface 370 can be coplanar with the clamping surface plane 910 and the first clamp angle 2100 and the second clamp angle 2200 can be of the same value and also have the same value as clamp angle 2200.

In the embodiment of FIG. 7, the first clamping surface 240 and the second clamping surface 370 extend from the lead side to the tail side and intersect a tail plane 920 which can be perpendicular to the top surface plane 930. The clamping surface plane 910 can intersect the tail plane 920 at a tail angle 2500. A first side plane 950 can be parallel to a second side plane 960. A parallel plane 940 can be parallel to the top surface plane 930 and perpendicular to the lead plane 900. The clamping surface plane 910 can intersect the lead plane 900 at a guide angle 2600 between the clamping surface plane 910 and the parallel plane 940. The clamping surface plane 910 can intersect the tail plane 920 at a tail guide angle 2700.

The clamp angle 2000 can have a value in a wide range from 75° to greater than 25°. Ranges regarding clamp angles herein are disclosed from greater angle value to lesser angle value as is consistent with the concept that for a value of the clamp angle 2000 that is greater the reaction force N has a greater component directed toward the head lead side 130 (Example and FIGS. 16, 28 and 29), while for a value of the clamp angle 2000 which is lesser the component of reaction force N directed toward the head lead side 130 is comparatively less. In an embodiment, the clamp angle 2000 can have a value in a range of from 64° to greater than 25°; or 63° to 34°; 60° to 40°; or 59° to 45°; or 58° to 48°; or 58° to 54°; or 57° to 49°; or 56° to 50°; or 56° to 51°; or 56° to 52°; or 56° to 53°; or 56° to 54°; or 56° to 55°. In an example, the embodiment of FIG. 2 can have the clamp angle 2000 of 56°, or about 56°. Ranges of values for the first clamp angle 2100 and the second clamp angle 2200 are also disclosed from greater value to lesser value.

The first clamp angle 2100 and the second clamp angle 2200 can be the same or can be different. In the embodiment of FIG. 7, the first clamping surface 240 and the second clamping surface 370 can be coplanar. The first clamping surface 240 can have the first clamp angle 2100 from lead plane 900. The first clamp angle 2100 can have a value in a range of from 64° to greater than 25°; or 63° to 34°; 60° to 40°; or 59° to 45°; or 58° to 48°; or 58° to 54°; or 57° to 49°; or 56° to 50°; or 56° to 51°; or 56° to 52°; or 56° to 53°; or 56° to 54°; or 56° to 55°. In an example, the embodiment of FIG. 2 can have the first clamp angle 2100 of 56°, or about 56°

The first clamping surface 370 can have the second clamp angle 2200 from the lead plane 900. The second clamp angle 2200 can have a value in a range of from 64° to greater than 25°; or 63° to 34°; 60° to 40°; or 59° to 45°; or 58° to 48°; or 58° to 54°; or 57° to 49°; or 56° to 50°; or 56° to 51°; or 56° to 52°; or 56° to 53°; or 56° to 54°; or 56° to 55°. In an example, the embodiment of FIG. 2 can have the second clamp angle 2200 of 56°, or about 56°.

In an embodiment, the clamp angle 2000, the first clamp angle 2100 and the second clamp angle 2200 can respectively have values which can be the same or about the same. In an embodiment, each of the clamp angle 2000, the first clamp angle 2100 and the second clamp angle 2200 can have a value of 56°, or about 56°. In an embodiment, the clamp angle 2000, the first clamp angle 2100 and the second clamp angle 2200 can have values which are not the same.

The clamp head 100 provides a mechanical advantage inhibiting pull through at least in part by the angles which can be used as measured from the respective clamping surfaces and the shank or portion thereof. In an embodiment, a first side shank angle 2300 can be measured between the first clamping surface 240 and the first side first gripper mark 500 and/or shank first side 482. A second side shank angle 2400 can be measured between the second clamping surface 370 and the second side first gripper mark 590 and/or shank second side 484.

FIG. 7 illustrates the first side shank angle 2300 between the first side first gripper mark 500 and the first clamping surface 240. The first side shank angle 2300 can have a value greater than 90°, or equal to 90°; or less than 90°. The embodiment of FIG. 2 illustrates the first side shank angle 2300 of 90°; or about 90°. The first side shank angle 2300 can have a value can have a value in a range of from 125° to 90°; or 115° to 90°; or 90° to greater than 25°; or 110° to 70°; or 95° to 85°; or 97° to 33°; or 98° to 33°; or 63° to 34°; or 60° to 40°; or 59° to 45°; or 58° to 48°; or 58° to 54°; or 57° to 49°; or 56° to 50°; or 56° to 51°; or 56° to 52°; or 56° to 53°; or 56° to 54°; or 56° to 55°.

FIG. 7 illustrates the second side shank angle 2400 between the second side first gripper mark 590 and the second clamping surface 370. The second side shank angle 2400 can have a value greater than 90°, or equal to 90°; or less than 90°. The embodiment of FIG. 7 illustrates the second side shank angle 2400 of 90°; or about 90°. The second side shank angle 2400 can have a value can have a value in a range of from 125° to 90°; or 115° to 90°; or 90° to greater than 25°; or 110° to 70°; or 95° to 85°; or 97° to 33°; or 98° to 33°; or 63° to 34°; or 60° to 40°; or 59° to 45°; or 58° to 48°; or 58° to 54°; or 57° to 49°; or 56° to 50°; or 56° to 51°; or 56° to 52°; or 56° to 53°; or 56° to 54°; or 56° to 55°. FIG. 7 also illustrates the guide angle 2600 between the clamping surface plane 910 and parallel plane 940. The guide angle 2600 can be complimentary to the clamp angle 2000 and can have a plane parallel to the collation angle 1000.

FIG. 8 is a detailed perspective view of the clamp head 100 illustrating clamp head dimensions. The dimensions of clamp head 100 can also contribute to the inhibition of pull through in addition to the angles of clamp head 100 and other factors disclosed herein (for example FIGS. 18, 19 and 20, as well as the Example). The use of a clamp angle 2000 (FIG. 7) can result in a clamp head 100 having a lead side height 855 which can have a greater dimensional value than tail height 835. The head lead side 130 can have a first lead side height 850 and a second lead side height 860 which can be the same or different. The head tail side 150 can have a first side tail height 830, the tail height 835 and a second side tail height 840 which can be the same or different.

In an embodiment, the clamp head nail 100 is a T-head nail which can be collated in the nail stick 10. The clamp head 100 can have the clamp head width 800. The clamp 200 can have a clamp lead width 890. In an embodiment, the clamp lead width 890 can have a first clamping surface width 882, a lead center width 884 which can be the width of the shank lead face 483, and a second clamping surface width 886. The shank lead face 483 can be coplanar with the head lead face 140 to support respectively abutting the plurality of clamp head nails 1. The clamp 200 can have a first side clamp length 870 and a second side clamp length 880.

The geometry of the clamp 200 can also contribute to the shape of the clamping surfaces. The clamp 200 can have a first side lead edge 290, the first clamp edge 230, a first side shank edge 270, and the first clamping surface 240. The clamp 200 can have a second side lead edge 420, second clamp edge 350, a second side shank edge 400, and the second clamping surface 370. The clamp head 100 can have a first side top length 810 and a second side top length 820. There can be wide variation in the geometry and dimensions of the clamp head 100.

The FIG. 8 illustrates the clamp head 100 head top 170 and striking surface 190. The head top 170 can also have a lead top edge 220, a tail top edge 360, as well as a first side top edge 280 and a second side top edge 410.

The head tail side 150 of the clamp head 100 can have a first side tail edge 255 and a second side tail edge 380. The head tail side 150 can have a clamp tail width 895, a first side tail width 300, a head tail center width 253 which can be the width of the nail shank tail face 485, and a second side tail width 430. The nail shank tail face 485 can be coplanar with the head tail face 160 to support respectively abutting the plurality of clamp head nails 1 in the nail stick 10.

The nail shank 110 can have a nail lead side 15 and a nail tail side 25. The shank lead face 483, a shank lead curved surface 480, the shank tail face 485, and a shank tail curved surface 490 can be on the nail shank 110.

Figure 9:
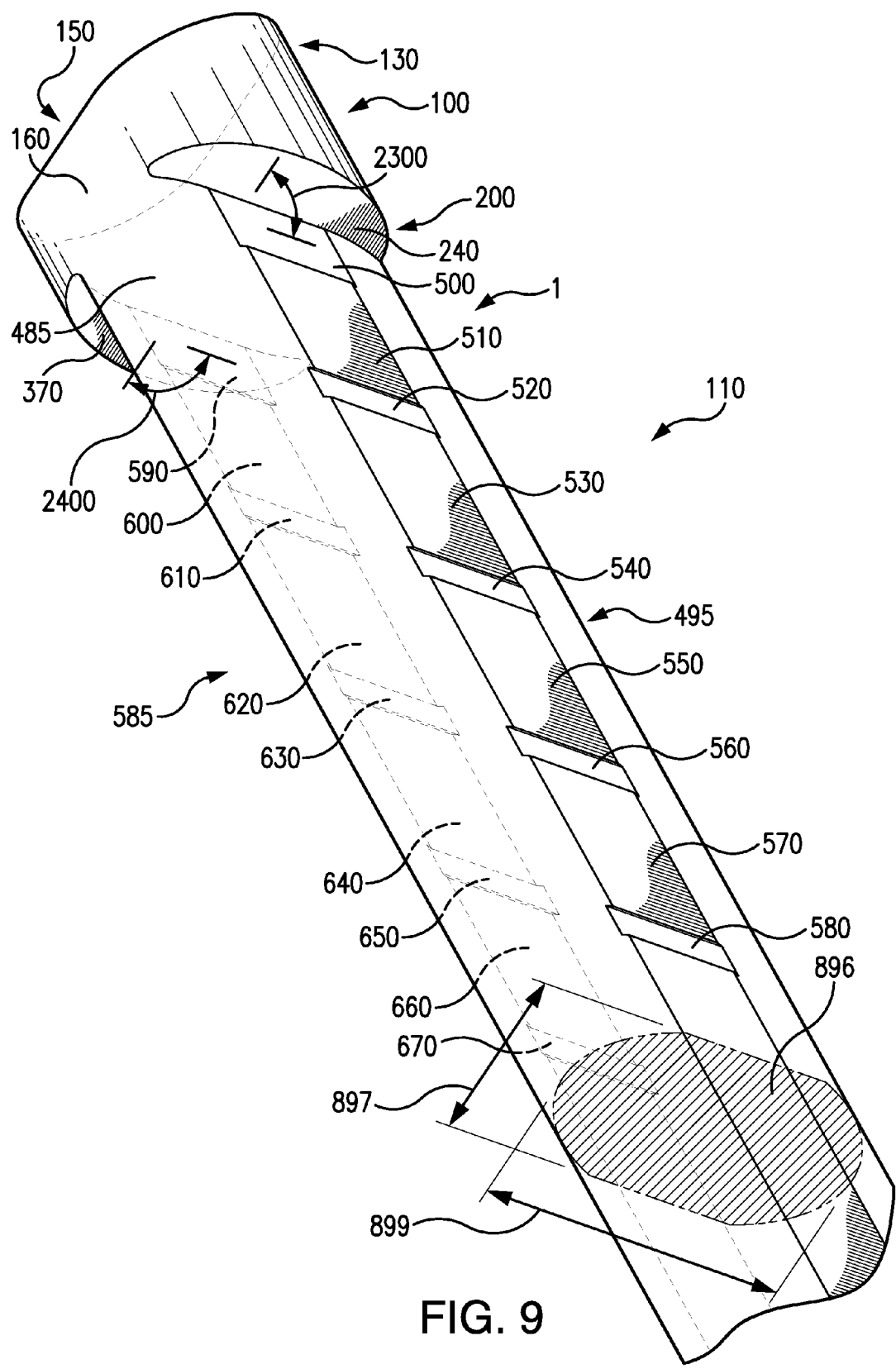
FIG. 9 is a perspective view of the clamp head illustrating a first clamping surface and a second clamping surface.

FIG. 9 is a perspective view of the clamp head 100 and the clamp 200 and having the first clamping surface 240 and the second clamping surface 370. FIG. 9 also illustrates the first side shank angle 2300 and second side shank angle 2400. The clamping surfaces and the shank angles which are disclosed herein contribute to the inhibition of pull through. The shank tail face 485 and head tail face 160 can be coplanar to achieve a collation of abutting clamp head nails 1 in a nail stick 10.

In addition to the gripper marks and gripper areas of FIG. 1A, FIG. 9 illustrates the gripper marks and gripper areas present on the second side gripper area 585 of gripper area 492 (FIG. 1A). In the clamp head nail 1 of FIG. 9, gripper marks are shown, for example second side gripper marks 590,

610, 630, 650 and 670. Second side gripper area surfaces 600, 620, 640 and 660 respectively are located between adjacent gripper marks FIG. 9 also illustrates the shank width 897 and the shank length 899 of the nail shank 110. Shank cross sectional area 896 is also shown. This disclosure is not limited in regard to respective values shank width 897 and shank length 899. In an embodiment, the clamp head nail 1 can have the value of shank width 897 in a range of from 0.03 inch, or less, through 0.15 inch, or greater. In an embodiment, the clamp head nail 1 can have a value of shank length 899 in a range of from 0.25 inch, or less, through 6 inches, or greater.

Figure 10:
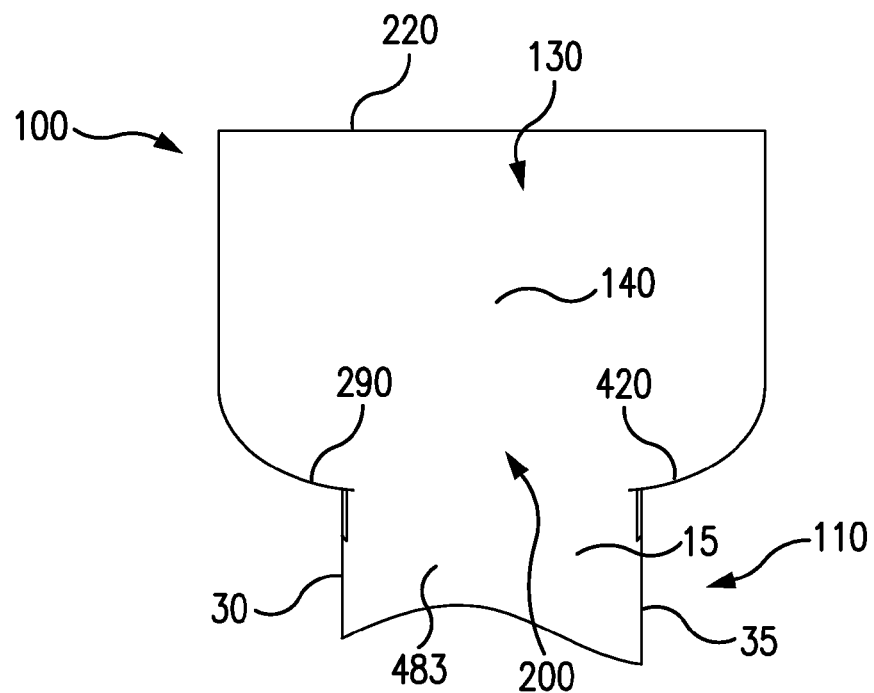
FIG. 10 is a lead side view of the clamp head.

FIG. 10 illustrates the nail lead side 15 view of the clamp head 100 and the clamp 200. The nail lead side 15 can have the head lead side 130. The head lead side 130 can have the head lead face 140 and the lead top edge 220. In the embodiment, the head lead face 140 is illustrated as continuous with the shank lead face 483 to support abutment of a clamp head nail 1 in a nail stick 10. FIG. 10 also illustrates portions of the first side lead edge 290 and the second side lead edge 420.

Figure 11:
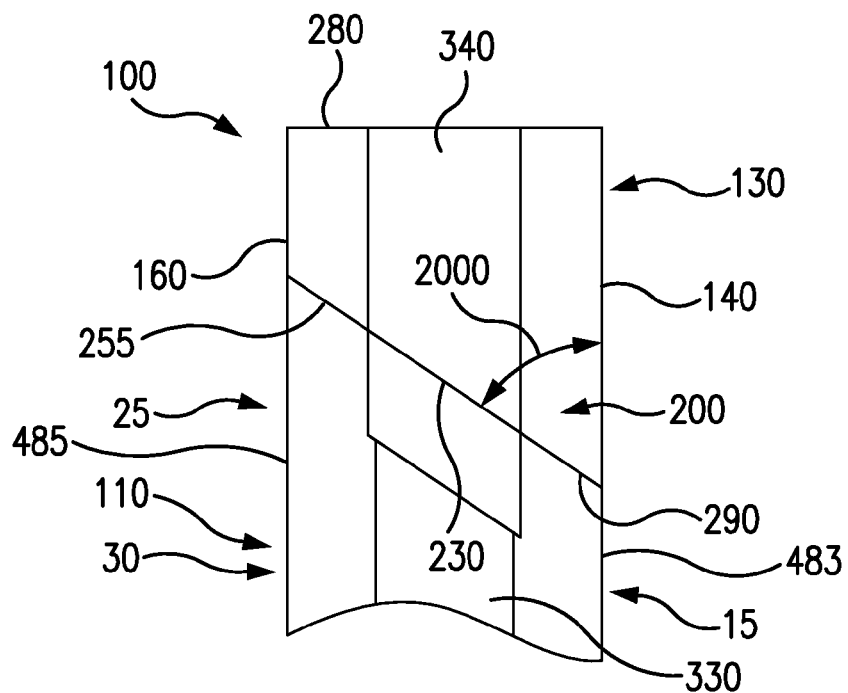
FIG. 11 is a first side view of the clamp head.

FIG. 11 is a first side 30 view of the clamp head 100 which illustrates that the head lead face 140 can be coplanar with the shank lead face 483 and that the head tail face 160 can be coplanar with the shank tail face 485. The clamp head nail 1 of this configuration can be collated into the nail stick 10 having a plurality of clamp head nails abutting one another. Additionally, the coplanar configuration of the respective head faces with the respective shank faces allow the head to be positioned at a variety of locations along an abutting shank and/or head and to use of a value of the collation angle 1000 which can be in a wide range in the nail stick 10, such as a value greater than 25°. Use of the shank lead face 483 and/or the head tail face 160 which does not extend beyond the plane of a shank face allows adjacent shank and/or heads to be abutted against one another in the nail stick 10. In an embodiment, the clamp angle 2000 can have a value which is measured from the lead plane 900 to which head lead face 140 can be coplanar to the clamping surface plane 910 (FIG. 7) to which the first clamping surface 240 and/or second clamping surface 370 can be coplanar (FIG. 7). FIG. 11 illustrates the first side top edge 280. The first side tail edge 255, the first side lead edge 290 and the first clamp edge 230 of the first clamping surface 240 can penetrate and/or clamp into a workpiece. In an embodiment, the clamp head 100 can have a first side head rolled surface 340, and the nail shank 110 can optionally have the first side rolled surface 330.

Figure 12:
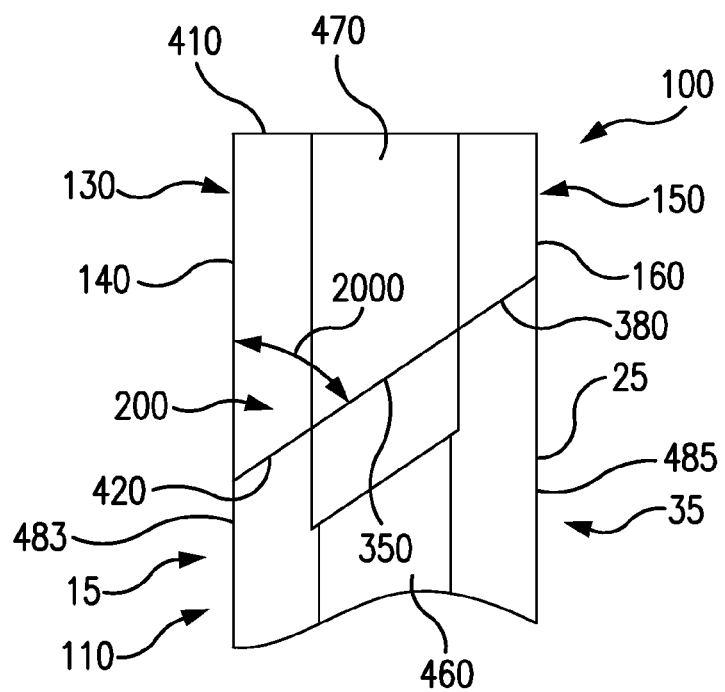
FIG. 12 is a second side view of the clamp head.

FIG. 12 is a second side 35 view of the clamp head 100 that illustrates the advantages disclosed with respect to FIG. 11, such that the head lead face 140 can be coplanar with the shank lead face 483 and that the head tail face 160 can be coplanar with the shank tail face 485. In an embodiment, the clamp angle 2000 can be measured between the lead plane 900 (FIG. 7) and the clamping surface plane 910 (FIG. 7) to which second clamp edge 350 can be coplanar. FIG. 12 illustrates the second side top edge 410. The second side lead edge 420, the second clamp edge 350 of second clamp surface 370, and the second side tail edge 380 of second clamping surface 370 can penetrate and/or clamp into a workpiece. In an embodiment, the clamp head 100 can have a second side head rolled surface 470, and the nail shank 110 can optionally have a second side rolled surface 460.

Figure 13:
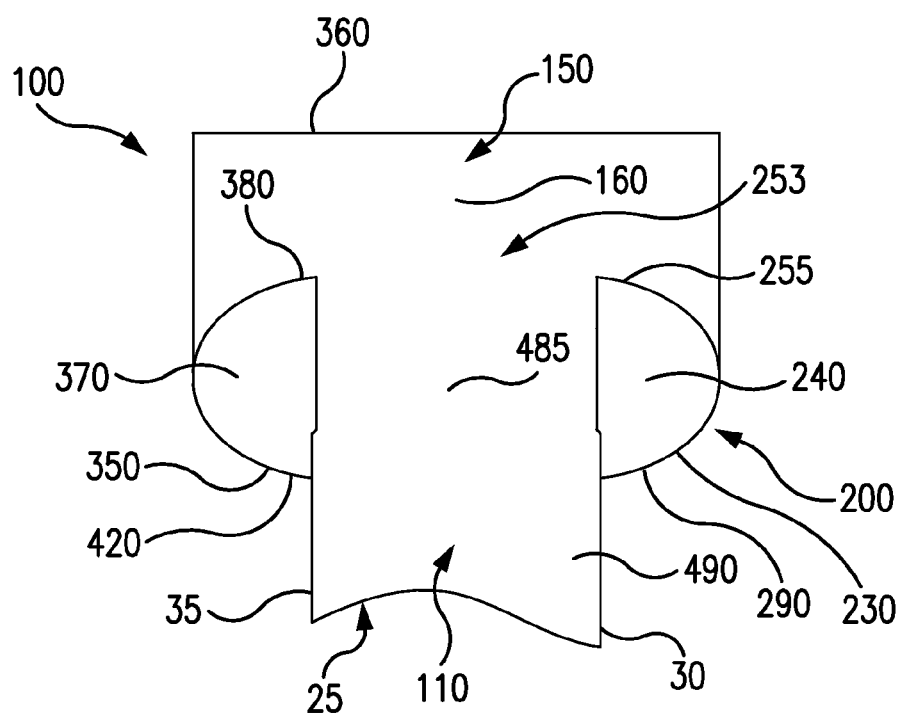
FIG. 13 is a tail side view of the clamp head.

FIG. 13 illustrates the head tail side 150 view of the clamp head 100. The head tail face 160 of the head tail side 150 can be coplanar with shank tail face 485 supporting abutment of the clamp head nail 1 in a nail stick. The first clamp edge 230 of the first clamping surface 240 and the second clamp edge 350 of the second clamping surface 370 can be coplanar. These surfaces can contribute to inhibiting pull through. In an embodiment, the first tail edge 255 can be adjacent to the head tail center width 253 which can be the width of the shank tail face where it meets the head tail face 160, and also adjacent to the second tail edge 380. FIG. 13 also illustrates the tail top edge 360, the first side lead edge 290 and the second side lead edge 420. In an embodiment, nail shank 110 can optionally have a shank tail curved surface 490.

Figure 14:
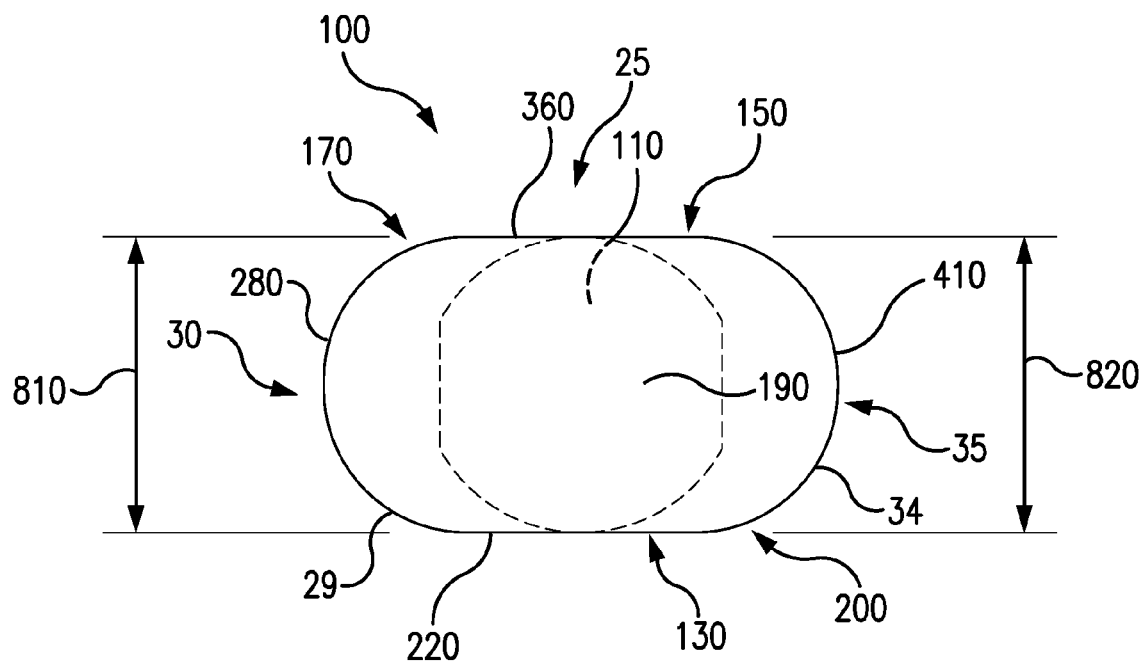
FIG. 14 is a head top view of the clamp head.

FIG. 14 is a head top 170 view of the clamp head 100 illustrating the first offset 29 on the first side 30, as well as the second side 35 and the second offset 34 on the second side 35, which can form the first clamping surface 240 and the second clamping surface 370. FIG. 14 additionally illustrates an embodiment in which the first side top length 810 and second side top length 820 can be the same and/or are not greater than the nail shank length 899. In an embodiment, the first side top length 810 and second side top length 820 can have values which can be the same as that of the nail shank length 899. In another embodiment, the first side top length 810 and second side top length 820 can have values which can be less than that of the nail shank length 899. FIG. 14 also illustrates the nail tail side 25, a head tail side 150 and a head lead side 130 having the clamp 200. The nail can be struck on the head top 170 striking surface 190. The tail top edge 360, the first side top edge 280 and the second side top edge 410 are also illustrated. Nail shank 110 is shown in hidden lines.

Figure 15:
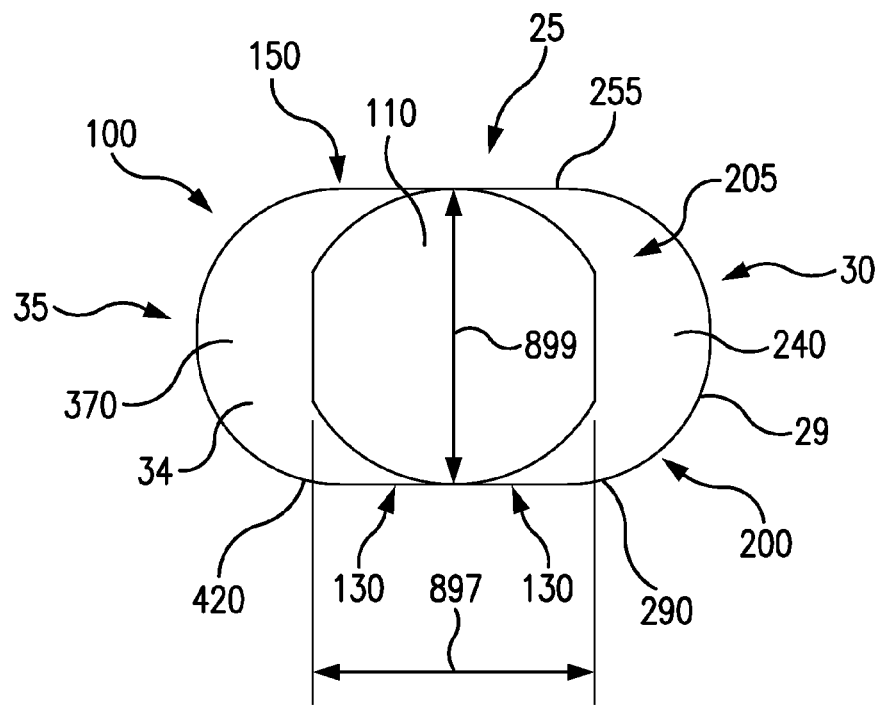
FIG. 15 is a clamping surface side view of the clamp head.

FIG. 15 is a clamping surface side 205 view of the clamp head 100 which is the underside view of the head of FIG. 14. FIG. 15 illustrates the first clamping surface 240 and the second clamping surface 370. It also illustrated the first side 30, the second side 35, the nail tail side 25, the head tail side 150 and the head lead side 130 having the clamp 200. A section of a nail shank 110 is also illustrated.

FIG. 16 is the first side 30 view detail illustrating clamp head 100 angles, such as 2000, 2500, 2600, 2700, 2800, 2900, 3000, 3100, 3200 and 3300, which are disclosed in detail herein. FIG. 16 illustrates the clamp angle 2000 and the guide angle 2600, which is the compliment to the clamp angle 2000. The guide angle 2600 can provide an alignment which can be used to guide the nail stick 10 in a nailer magazine. In an embodiment, the guide angle 2600 can be the same as the collation angle 1000 (FIG. 2).

The tail side 150 of the clamp head nail 1 can have the tail angle 2500 and the tail guide angle 2700 which in an embodiment together equal 180° such that the shank tail face 485 is coplanar with the head tail face 160.

For reference, FIG. 16 illustrates the first clamp edge 230 which can be an edge of the first side clamping surface 240 (FIG. 7), a vector N normal to clamp edge 230, a vertical vector Y1 and extend in the head top 170 direction and a horizontal vector X1. Vector P can be collinear with vertical vector Y1 and extend in the nail tip 120 direction.

As disclosed herein, the design of clamp head nail 1 achieves a plurality of clamp head nails 1 which can be collated at a collation angle 1000 greater than 25°. Additionally, the clamp angle 2000 contributes to the inhibition of pull through and also can be a complimentary angle to the guide angle 2600.

FIG. 16 illustrates a clamp compliment angle 2800, which in an embodiment can be 34°, a clamping surface angle 2900 which in an embodiment can be 56°, a clamping surface supplementary angle 3000 which in an embodiment can be 124°, a congruent clamp angle 3100 which in an embodiment can be 56°, an angle from vertical 3200 which in an embodiment can be 34°, and an adjacent angle 3300 which in an embodiment can be 56°. In an embodiment, the clamp head 100 angles of the second side 35 can be the same as those of the first side 30.

FIG. 16 also illustrates first side 30 of an embodiment of the clamp head nail 1 having the clamp 200 and the clamp angle 2000 and the first clamp edge 230. The embodiment of FIG. 16 can have the head lead side 130. The first side top edge 280 and the lead top edge 220 are also shown. The clamp head 100 can optionally have the first side head rolled surface 340, and the nail shank 110 can optionally have the first side rolled surface 330. The clamp head 100 can have the head tail side 150 which can have the tail top edge 360. The nail tail side 25 can have the shank tail face 485 and shank tail curved surface 490. The nail shank 110 can have the shank lead curved surface 480, and the shank lead face 483.

In an embodiment, the individual nails in the nail stick 10 have shanks which can be configured in an abutting array and the head offset portions 16 can be frangibly and suitably held in a nail stick formation array enabling the individual nails to be stripped from the remaining nails of the nail stick by impacting the striking surface of the leading nail while supporting the remaining nails of the stick beneath their head portions on the clamping surfaces thereof. The juncture between with the plurality of the nail shanks 110 and/or the plurality of the clamp heads 100 can in a non-limiting example have mucilage; which can optionally extend between each clamp head nail along the entire length of the nail, or portions thereof Preferably, means for frangibly collating the nails forming the nail stick 10 can take the form of a cement, such as a thermoplastic resin, or the like which covers at least the abutting nail shanks 110 of the nails forming the nail stick 10. After the mucilage has set, the wires can be trimmed. The head can then be forged into its final shape, such as, for example, a T-head, a D-head or other suitable shape.

FIG. 17 is a manufacturing flow diagram for making the clamp head nail and nail stick. A method of making the nail stick can have a step of assembling a plurality of metal wires and arranging the wires to abut along their longitudinal lengths. After the wires are arranged, the wires can be immersed in mucilage, such as for example, a cement or thermoplastic resin such that the wires can be joined to each other.

It can be seen that by providing the angular coplanar clamping surfaces beneath the head offset portions 16 of the nails forming the stick array, the nail stick can be efficiently and effectively supported within a conventional angular magazine assembly.

STEP 1 of an embodiment of a manufacturing process can have a step of providing and/or receiving raw material for manufacture of one or a plurality of head clamp nails 5 and/or nail shank 110 raw material. The raw material can have a rod form which can be provided on a spool and can have a wide range of diameters, such as 1/16 inch, 1/8 inch, 3/16 inch or 1/4 inch, or other diameter suitable for manufacturing a fastener, such as a nail.

A broad variety of raw materials can be used to make clamp head nails and/or nail sticks having the plurality of clamp head nails 1. The materials can be any material that fasteners can be made from, such as steel, stainless steel, aluminum, copper, brass, iron, alloys, plastics, injection molded plastic, thermoset plastics, polymers, reinforced plastics, ceramics, glass, carbon fiber, as well as synthetic and natural materials. Materials which are compliant with ASTM F1667 can be used.

In a non limiting example, the following materials be used to make clamp head nails and/or nail sticks having the plurality of clamp head nails 1: steel wire, which can be of low carbon, medium-low carbon, or medium-high carbon; stainless steel wire, which can be of types 302, 304, 305, or 316; carbon steel wire; copper or copper alloy; copper-clad steel wire or steel wire alloy; aluminum or aluminum alloy wire, which can be an alloy 2024, 5056, 6061, or 6110; or brass wire. Raw materials and/or clamp head nails can be chemically treated, surface treated, roughened, polished, clad or otherwise modified to achieve a fastening, oxidation inhibition, durability, quality, or other purpose.

STEP 2 can have a step of drawing the rod to a finished round wire diameter which can be of the gauge that the nail is intended to be, such as in a non-limiting example 14 gauge, 15 gauge, 16 gauge, or 18 gauge.

STEP 3 can have a step of assembling a band. During this step, the finished round wired can be wound onto spools which can be held by a payoff (apparatus and/or tool which can hold spools allowing the spools to rotate) and the spools can feed a plurality of separate wires concurrently into to a band line as a plurality of wires to form the band from which fasteners can be made.

STEP 4 can be to flatten wires to final dimensions of width (W) and thickness (T).

STEP 5 can be to collate the band. This collation step can include application of adhesive, cement, mucilage, or other bonding material. Application of the adhesive can be followed by a drying and/or curing step. This can form a collated band.

STEP 6 can be to feed the collated band into a press.

STEP 7 can have a step of gripping the band and punching the band to create one or a plurality of clamp heads on the wires of the collated band. In an embodiment, a die can be lowered to grip the fasteners in place such that the fasteners do not move when they are punched such that the clamp head is formed. The plurality of clamp head nails are headed (having a head formed upon the clamp head nails) in this step. In an embodiment, the gripping member or gripping tool can be angled to match the collation angle 1000. The underside of the head can be formed against this gripping member or gripping tool at the time of heading (punching) and the clamping surfaces can be formed at the collation angle. In an embodiment, the clamping surfaces can be the first clamping surface 240 and the second clamping surface 370.

In an embodiment, the header punch and cutter can be stepped to match the collation angle and wire geometry. The header punch can be used to make the clamp head shape. The cutter can be used to make the nail tip shape and produce the stepped collation.

In an embodiment, during STEP 7 the die can cut the band providing wire ends for heading and the header punch can then form the heads on the wires. In an embodiment, a gripping member or gripping tool can hold a band of collated wires in a press and a header punch can index to form the clamp head.

According to the present invention, the angular nail stick is configured so that nails over a 25° angle can be joined to each other with mucilage, adhesive, cement or other means and simultaneously formed in one press stroke of a forming press or stamping press.

STEP 8 can be to eject the formed clamp head nail 1 or the plurality of clamp head nails 1 from the press. In an embodiment, a die can retract followed by fasteners being ejected from the press.

FIG. 18 is a table of data regarding values and ratios of clamp head geometries.

FIG. 19 is a table of clamp head nail 100 ratios.

FIG. 20 is a table of data associated with the clamp head nail 100 ratios of FIG. 19.

EXAMPLE

In this example an embodiment of the clamp head nail was tested. Specifically, angular finish nails style ("FN") having an example embodiment of the clamp head 100 were compared against non-angular style ("DA") finish nails testing pull through resistance. Multiple tests were performed and proved that in a hard wood species, such as oak, the angular finish nail exhibited a higher pull through resistance than non-angular head nails. In high hardness, high density wood species (hard wood), the angular finish nails, i.e. clamp head nails, outperformed the non-angular version consistently.

Figure 21:
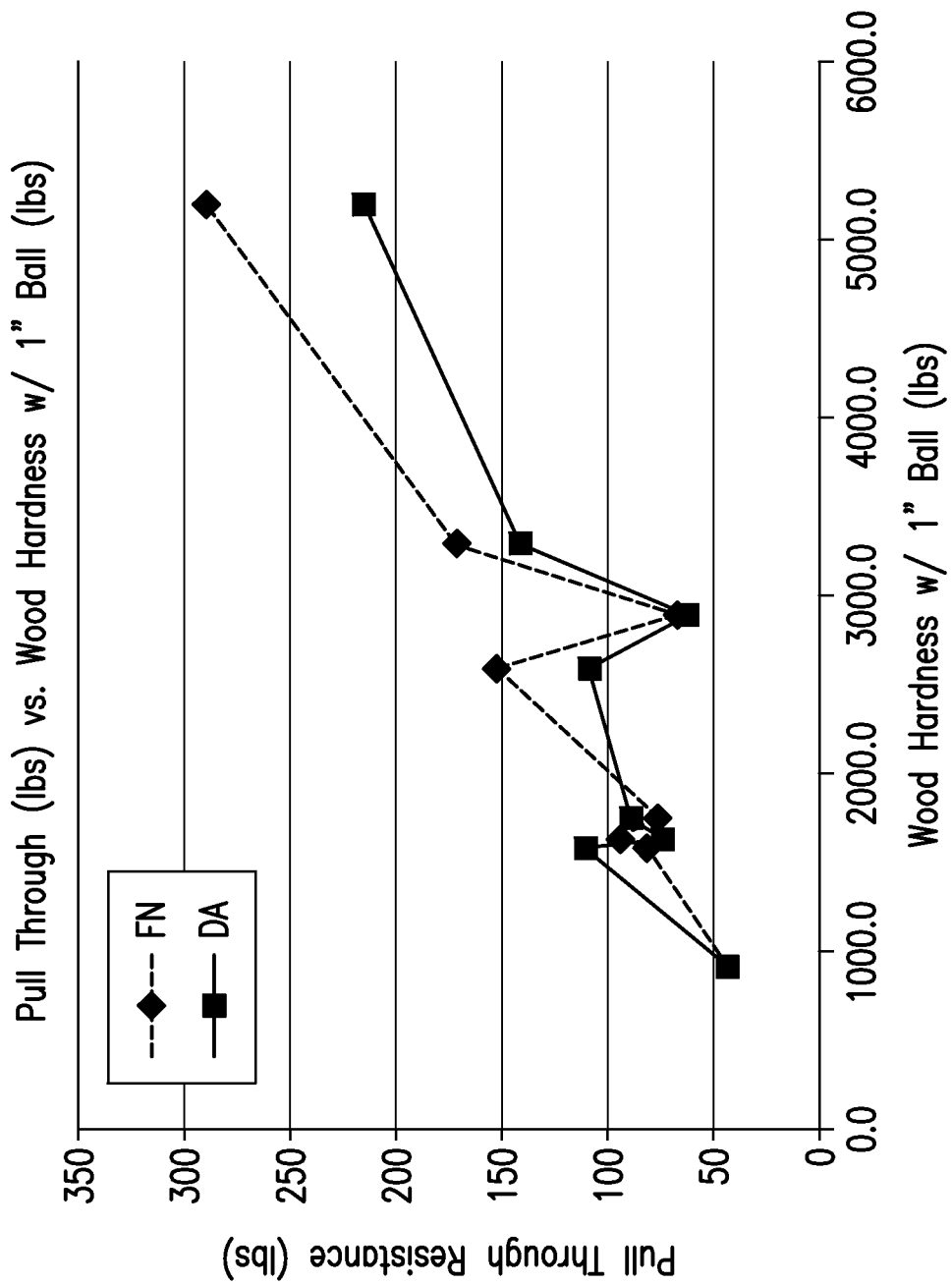
FIG. 21 is a graph of Pull Through (lbs) v. Wood Hardness w/1" Ball (lbs)

FIG. 21 is a graph of Pull Through (lbs) v. Wood Hardness w/1" Ball (lbs).

Figure 22:
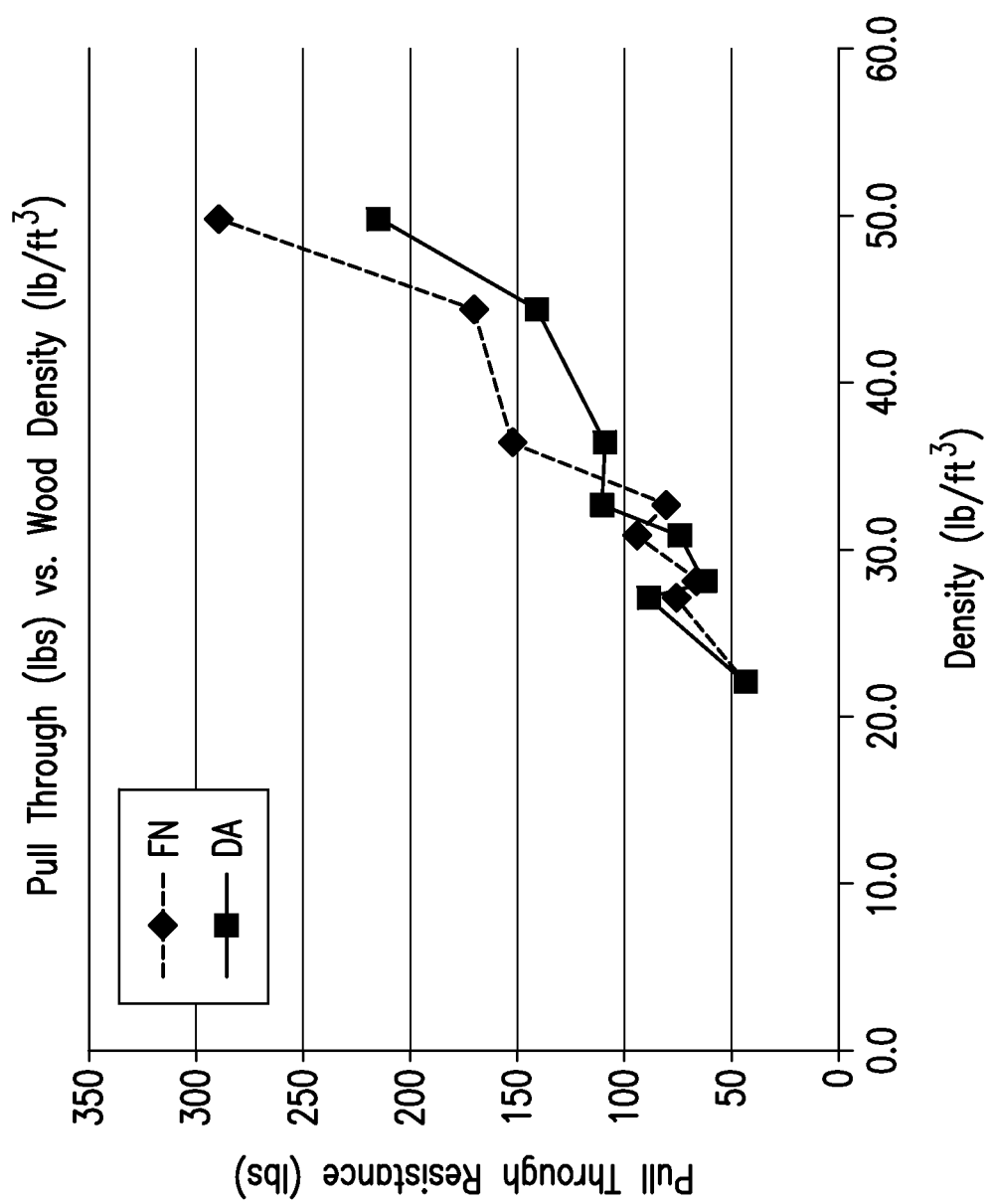
FIG. 22 is a graph of Pull Through (lbs) v. Wood Density (lbs/ft^3)

FIG. 22 is a graph of Pull Through (lbs) v. Wood Density (lbs/ft^3).

The testing of this Example evaluated 30 nails from each of two sample groups which were set into an oak board using a Bostitch DA1564K pneumatic tool. The non-angular head nail sample group used in this example was a PDA15175—Porter Cable 15G Brad Nail 1.75 inches in length. The inventive clamp head nail sample group was designated PDA15175-FN. Thirty (30) nails of each type were tested in accordance with section 15 of ASTM D1037 with the following notations and/or modifications: (1) D1037 offers two types of methods for the wood, dry (15.3) and wet (15.4); and the testing of this Example was performed using the dry (15.3) evaluation only, and (2) D1037 section 15.6 recites the test speed at 0.06 in/min, but the test of this Example was conducted at a speed of 0.5 in/min.

The depth of each nail was set so the top of the head was set flush with the top surface of an oak board. An Instron (Instron, 825 University Ave., Norwood, Mass. 02062-2643, 1 800 877 6674) Model 5582 universal testing machine was then used to extract each individual nail so the head was pulled through the oak board. The maximum force required to do so was recorded. Information regarding each board's dimension and density was recorded.

FIG. 23 is a table of oak board information.

FIG. 24 is a table of data regarding an example DA nail sample group tested in oak.

FIG. 25 is a table of data regarding an FN clamp head nail 1 sample group tested in oak.

Figure 26:
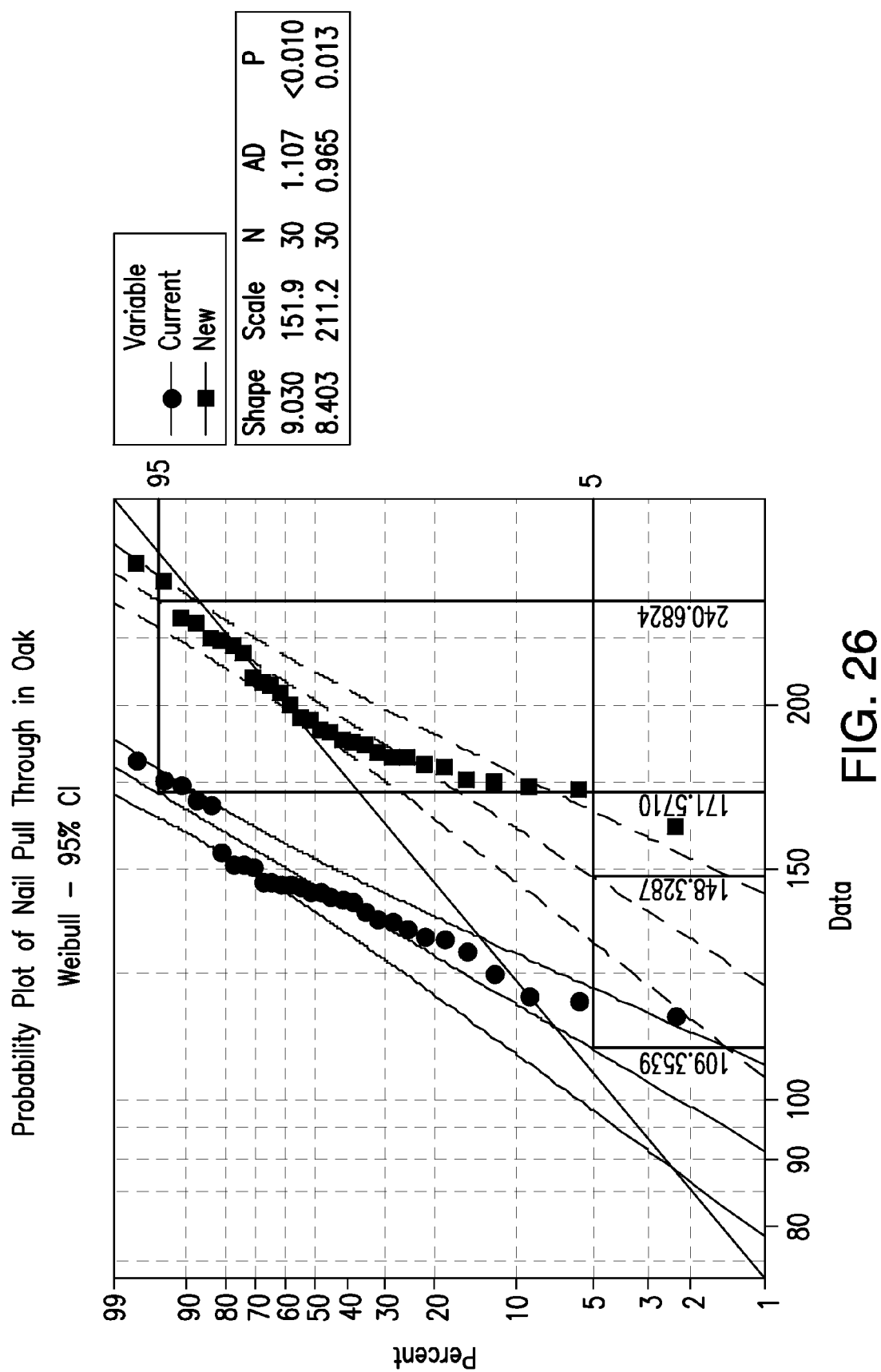
FIG. 26 is a Probability Plot of Nail Pull Through in Oak Weibull—95 C1.

FIG. 26 is a Probability Plot of Nail Pull Through in Oak Weibull—95 C1, in which "C1" refers to the confidence level setting of the statistical analysis.

Figure 27:
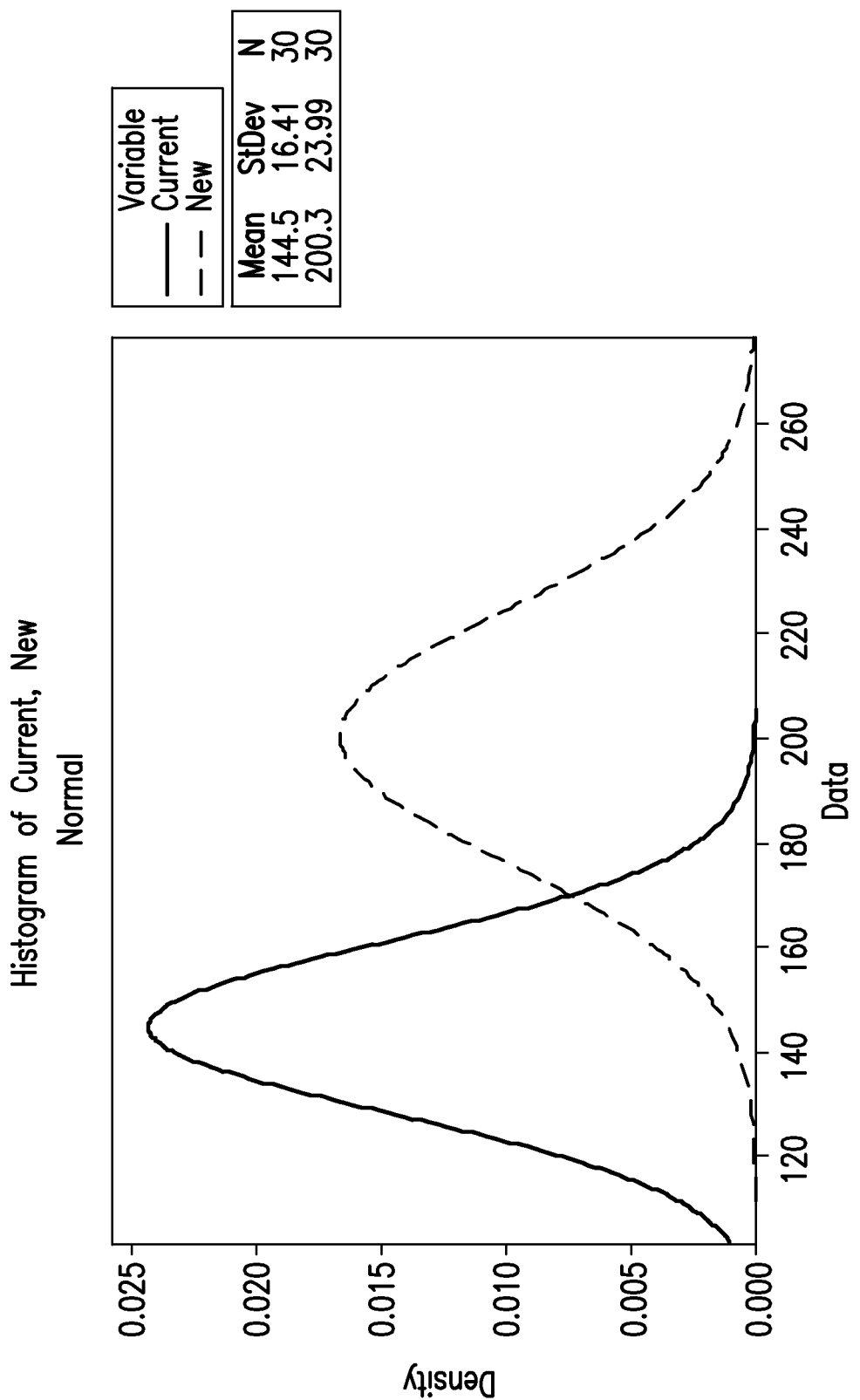
FIG. 27 is a histogram comparing performance of an example DA nail to an FN clamp head nail.

FIG. 27 is a histogram comparing performance of an example DA nail to the FN embodiment of the clamp head nail 1 having a clamp head 100 tested in oak Regarding this Example, FIG. 28 illustrates a non-angular head. Reaction force N and pull force P for a non-angular head profile nail consider:

$$\Sigma F_y = 0 = N - P => N = P; (1) N = P$$

FIG. 29 is a clamp head profile. Reaction force N and pull force P for an angular head profile nail consider:

$$\sum F_x = 0 = -N_x + N\sin\phi => N_x = N\sin\phi \quad (2)$$

$$f_y = \mu N_x \ \& \ \phi = 34°$$

$$\sum F_y = 0 = f_y + N\cos\phi - P => P =$$

$$\mu N_x + N\cos\phi => P = \mu N\sin\phi + N\cos\phi$$

$$P = N[\mu(0.56) + (0.83)] => N = \frac{P}{.56\mu + .83}$$

The force applied, P, to pull the fastener of FIG. 1 through the wood is a function of the angle of the geometry and the normal force resulting from the contact between the fastener and the wood. For the angular fastener of FIG. 1, the vertical force component is less than the vertical force component in the non-angular DA profile head. The vertical force component is the force required to break the wood fibers as the head is displaced through the wood and therefore it would take a larger force, P, to create the same displacement in the angular fastener versus the non-angular fastener. The testing and analysis of the Example investigated the effects of the inventive clamp head 100. An assumption has been incorporated into the analysis which assumes that shank friction forces are equivalent, or not meaningfully different, between the two sample groups.

The scope of this disclosure is to be broadly construed. It is intended that this disclosure disclose equivalents, means, systems and methods to achieve the devices, designs, operations, control systems, controls, activities, mechanical actions, physics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. Additionally, this disclosure regards a fastener, a nail and nail stick and its many aspects, features and elements. A fastener can be dynamic in its use and operation. This disclosure is intended to encompass the equivalents, means, systems and methods of the use of the clamp head nail 1 or nail stick 10 and their many aspects consistent with the description and spirit of the apparatus, means, methods, functions and operations disclosed herein. The claims of this application are likewise to be broadly construed.

The description of the inventions herein in their many embodiments is merely exemplary in nature and, thus, variations that do not depart from the gist of the invention are intended to be within the scope of the invention and the disclosure herein. Such variations are not to be regarded as a departure from the spirit and scope of the invention.

It will be appreciated that various modifications and changes can be made to the above described embodiments of a fastener, a nail and nail stick as disclosed herein without departing from the spirit and the scope of the following claims.

We claim:

1. A nail stick, comprising:
   a collation angle; and
   a plurality of clamp head nails having clamp heads and contiguous nail shanks, each nail shank having a shank lead face and a shank tail face, and each clamp head having:
      a head lead face that is coplanar with the shank lead face and
   a head tail face that is coplanar with the shank tail face,
      a first side lead edge and a second side lead edge that are curved;
   wherein the plurality of clamp head nails are configured such that the collation angle has a value greater than 25 degrees, and
   wherein the clamp heads have a clamp angle having a value in a range of from 75 degrees to greater than 25 degrees.

2. The nail stick according to claim 1, wherein the collation angle has a value in a range of from 30 degrees to 50 degrees.

3. The nail stick according to claim 1, wherein the collation angle has a value in a range of from 31 degrees to 45 degrees.

4. The nail stick according to claim 1, wherein the clamp angle having a value in a range of from 60 degrees to 40 degrees.

5. A nail, comprising:
a shank having a longitudinal axis, a shank lead face and a shank tail face;
a clamp head having a striking surface orthogonal to the shank, the clamp head having:
a head lead face that is coplanar with the shank lead face and a head tail face that is coplanar with the shank tail face,
a first side lead edge and a second side lead edge that are curved and,
a clamp angle having a value in a range of from 75 degrees to greater than 30 degrees.

6. The nail according. to claim 5, wherein the clamp angle has a value in a range of from 60 degrees to 40 degrees.

7. The nail according to claim 5, wherein the clamp head comprises a T-head shape.

8. The nail according to claim 5, wherein the clamp head has a first offset and a second offset.

9. The nail according to claim 5, wherein the clamp head has a clamping surface with a surface area value in a range of from 2.0 mm2 to 4 mm2 .

10. The nail according to claim 5, wherein the clamp head has a clamping surface with a surface area value in a range of from 2.4 mm2 to 3.7 mm2 .

11. The nail according to claim 5, wherein the clamp head has a ratio of head top surface area to clamping surface area in a range of from 1.15 to 2.5.

12. The nail according to claim 5, wherein the clamp head has a ratio of head top surface area to clamping surface area in a range of from 1.2 to 2.4.

13. The nail according to claim 5, wherein the clamp head has a ratio of head top surface area to clamping surface area in a range of from 1.3 to 2.3.

14. The nail according to claim 5, wherein the clamp head has a first offset side which has a
a first side shank angle having, a value in a range of from 115 degrees to 40 degrees and a second offset side having a second side shank angle having a value in a range of from 115 degrees to 40 degrees.

\* \* \* \* \*